US012609102B2

(12) United States Patent
Roisman

(10) Patent No.: US 12,609,102 B2
(45) Date of Patent: Apr. 21, 2026

(54) TRAINING DATASET GENERATION FOR SPEECH-TO-TEXT SERVICE

(71) Applicant: SAP SE, Walldorf (DE)

(72) Inventor: Pablo Roisman, Sunnyvale, CA (US)

(73) Assignee: SAP SE, Walldorf (DE)

( * ) Notice: Subject to any disclaimer, the term of this patent is extended or adjusted under 35 U.S.C. 154(b) by 238 days.

(21) Appl. No.: 17/490,514

(22) Filed: Sep. 30, 2021

(65) Prior Publication Data

US 2023/0098315 A1 Mar. 30, 2023

(51) Int. Cl.

*G06N 3/045* (2023.01)
*G10L 13/027* (2013.01)
*G10L 13/08* (2013.01)

(52) U.S. Cl.

CPC ............ *G10L 13/027* (2013.01); *G10L 13/08* (2013.01)

(58) Field of Classification Search

CPC .......... G06N 3/045; G06N 3/08; G06N 20/00; G06F 40/56; G06F 40/35; G06F 40/211; G06F 40/237; G06F 40/30; G10L 13/08; G10L 25/63; G10L 13/027; G10L 15/063; G10L 15/22; G10L 15/26; G10L 17/04; G10L 15/15; G10L 15/1815; G10L 13/02
See application file for complete search history.

(56) References Cited

U.S. PATENT DOCUMENTS

| | | | | |
|---|---|---|---|---|
| 5,283,737 | A * | 2/1994 | Van Praag | G06F 40/247 707/999.102 |
| 5,706,401 | A | 1/1998 | Tresp | |
| 6,972,763 | B1 * | 12/2005 | Millett | G06F 9/451 345/440 |
| 8,244,749 | B1 | 8/2012 | Das et al. | |
| 8,370,272 | B2 | 2/2013 | Wickel et al. | |
| 8,612,532 | B2 | 12/2013 | Bangalore et al. | |
| 9,390,087 | B1 * | 7/2016 | Roux | G06F 40/56 |
| 9,830,903 | B2 * | 11/2017 | Mason | G10L 25/48 |
| 10,607,598 | B1 * | 3/2020 | Larson | G10L 15/07 |
| 10,680,995 | B1 * | 6/2020 | Hinkle | H04L 12/1813 |
| 10,706,236 | B1 * | 7/2020 | Platt | G06F 40/253 |

(Continued)

FOREIGN PATENT DOCUMENTS

| | | |
|---|---|---|
| KR | 101851785 | 6/2018 |

OTHER PUBLICATIONS

"Levenshtein Distance," *Wikipedia*, www.wikipedia.org, visited Mar. 11, 2019, 8 pages.

(Continued)

*Primary Examiner* — Jakieda R Jackson
(74) *Attorney, Agent, or Firm* — Klarquist Sparkman, LLP

(57) ABSTRACT

Training data for a speech-to-text service can be generated according to a variety of techniques. For example, synthetic speech audio recordings for training a speech-to-text service can be generated in an automated system via linguistic expression templates that are input to a text-to-speech service. Pre-generation characteristics and post-generation adjustments can be made. The resulting adjusted synthetic speech audio recordings can then be used for training and validation. A large number of recordings can easily be generated for development, leading to a more robust service. Domain-specific vocabulary can be supported, resulting in a trained speech-to-text service that functions well within the targeted domain.

20 Claims, 14 Drawing Sheets

(56) References Cited

U.S. PATENT DOCUMENTS

| | | | | |
|---|---|---|---|---|
| 10,839,154 | B2 | 11/2020 | Galitsky | |
| 11,055,575 | B2 * | 7/2021 | Anushiravani | G06V 40/70 |
| 11,106,874 | B2 | 8/2021 | Roisman | |
| 11,263,533 | B2 | 3/2022 | Roisman | |
| 11,366,573 | B2 | 6/2022 | Roisman et al. | |
| 11,551,695 | B1 * | 1/2023 | Govindan | G10L 15/07 |
| 11,615,799 | B2 * | 3/2023 | Zhu | G06F 16/345 704/235 |
| 11,715,042 | B1 * | 8/2023 | Liu | G06F 40/247 705/26.1 |
| 12,079,737 | B1 * | 9/2024 | Biswas | G06F 16/26 |
| 2002/0143542 | A1 * | 10/2002 | Eide | G10L 13/02 704/260 |
| 2004/0176957 | A1 * | 9/2004 | Reich | G10L 13/07 704/260 |
| 2006/0149558 | A1 * | 7/2006 | Kahn | G10L 15/063 704/278 |
| 2009/0150441 | A1 | 6/2009 | Johnsen et al. | |
| 2009/0222268 | A1 * | 9/2009 | Li | G10L 13/04 704/E13.002 |
| 2011/0307404 | A1 | 12/2011 | Wickel et al. | |
| 2012/0075490 | A1 * | 3/2012 | Tsai | G11B 27/034 348/222.1 |
| 2013/0332160 | A1 * | 12/2013 | Posa | H04M 1/724 704/235 |
| 2015/0154189 | A1 * | 6/2015 | Raichelgauz | G06F 16/284 707/803 |
| 2015/0187359 | A1 * | 7/2015 | Bhaskaran | G10L 17/08 704/235 |
| 2015/0379081 | A1 * | 12/2015 | Lester | G06F 16/48 707/765 |
| 2016/0179751 | A1 | 6/2016 | Korjani et al. | |
| 2016/0335677 | A1 * | 11/2016 | Aleksic | G10L 15/01 |
| 2017/0092258 | A1 * | 3/2017 | Edrenkin | G10L 13/08 |
| 2018/0350390 | A1 * | 12/2018 | Shellef | G10L 15/01 |
| 2019/0130894 | A1 * | 5/2019 | Jin | G10L 21/00 |
| 2020/0019866 | A1 | 1/2020 | Roisman | |
| 2020/0097643 | A1 * | 3/2020 | Uzun | G06V 40/40 |
| 2020/0104354 | A1 * | 4/2020 | Anisimovich | G06F 40/295 |
| 2020/0105246 | A1 * | 4/2020 | Brake | G10L 15/26 |
| 2020/0105261 | A1 * | 4/2020 | Oleksandrovych | G10L 25/63 |
| 2020/0111482 | A1 * | 4/2020 | Chae | G06N 3/042 |
| 2020/0135175 | A1 * | 4/2020 | Katz | G10L 15/30 |
| 2020/0150839 | A1 | 5/2020 | Roisman et al. | |
| 2020/0242964 | A1 | 7/2020 | Wu | |
| 2020/0257857 | A1 | 8/2020 | Peper et al. | |
| 2020/0265829 | A1 * | 8/2020 | Liu | G10L 13/033 |
| 2020/0272741 | A1 | 8/2020 | Bhatia et al. | |
| 2020/0327196 | A1 | 10/2020 | Sampat et al. | |
| 2020/0335100 | A1 * | 10/2020 | Saon | G10L 15/22 |
| 2020/0349425 | A1 * | 11/2020 | Saha | G06N 3/08 |
| 2020/0356632 | A1 | 11/2020 | Roisman | |
| 2021/0034662 | A1 * | 2/2021 | Aher | G10L 15/1807 |
| 2021/0050025 | A1 * | 2/2021 | Huffman | G06N 3/045 |
| 2021/0074305 | A1 * | 3/2021 | Gopala | G06F 21/31 |
| 2021/0142789 | A1 * | 5/2021 | Gurbani | G10L 15/26 |
| 2021/0217404 | A1 * | 7/2021 | Jia | G10L 13/033 |
| 2021/0248998 | A1 * | 8/2021 | Schairer | G06F 3/167 |
| 2021/0304075 | A1 * | 9/2021 | Duong | G06N 20/00 |
| 2021/0350786 | A1 * | 11/2021 | Chen | G10L 13/08 |
| 2021/0375289 | A1 * | 12/2021 | Zhu | G10L 15/22 |
| 2021/0375291 | A1 * | 12/2021 | Zeng | H04L 67/306 |
| 2022/0028367 | A1 * | 1/2022 | Shekhar | G10L 13/047 |
| 2022/0051654 | A1 * | 2/2022 | Finkelstein | G10L 13/10 |
| 2022/0068257 | A1 * | 3/2022 | Biadsy | G10L 13/033 |
| 2022/0108079 | A1 | 4/2022 | Roisman | |
| 2022/0157323 | A1 * | 5/2022 | Verma | G06F 3/167 |
| 2022/0308844 | A1 | 9/2022 | Roisman | |
| 2022/0351715 | A1 * | 11/2022 | Freed | G06F 16/90332 |
| 2022/0366127 | A1 * | 11/2022 | Desh | G06Q 50/18 |
| 2023/0018384 | A1 * | 1/2023 | Finkelstein | G10L 13/033 |
| 2023/0058447 | A1 * | 2/2023 | Rosenberg | G06N 3/0455 |
| 2023/0222177 | A1 | 7/2023 | Roiseman | |

OTHER PUBLICATIONS

Withey, Where to get Chatbot Training Data (and what it is), blog.ubisend.com, Jul. 18, 2017, 6 pages.

Palmerlee (MattsterP), “Building an AI Chatbot using a Regular Expression Engine,” www.codeproject.com, Jun. 2007, 15 pages.

Jose, “Create your ELIZA Chatbot in 20 minutes with Regular Expressions (Day 6),” botartizan.com, visited Apr. 9, 2019, 9 pages.

Landgreen, “Chatbot Template (regular expressions) [‘Build a Chatbot’],” codepen.io, visited Apr. 9, 2019, 2 pages.

Pinard, “How to Boost Your Chatbot Performance Through Data,” blogs.sap.com, Feb. 11, 2019, 1 page.

Desot Thierry et al., “Towards a French Smart-Home Voice Command Corpus: Design and NLU Experiments,” Sep. 8, 2018, 12$^{th}$ European Conference on Computer Vision, ECCV 2012 [Lecture Notes in Computer Science], Springer Berlin Heidelberg, pp. 509-517.

Mishakova Anastasiia et al., “Learning Natural Language Understanding Systems from Unaligned Labels for Voice Command in Smart Homes,” 2019 IEEE International Conference on Pervasive Computing and Communications Workshops, IEEE, Mar. 11, 2019, pp. 832-837.

John Wieting et al., “Learning Paraphrastic Sentence Embeddings from Back-Translated Bittext,” arxiv.org, Cornell University Library, 201 Olin Library Cornell University, Ithaca, NY, 14853, Jun. 6, 2017, 12 pages.

Chao Wang et al., “Automatic induction of language model data for a spoken dialogue system,” Computers and the Humanities, Kluwer Academic Publishers, DO, vol. 40, No. 1, Nov. 8, 2006, pp. 25-46.

Chris Brockett et al., “Support Vector Machines for Paraphrase Identification and Corpus Construction,” 2005, retrieved from the Internet: https://www.microsoft.com/en-us/resear/ch/wp-content/uploads/2016/02/I05-50015B15D.pdf, 8 pages.

Unit Chandra et al., “System for Semi-Automated Chatbots Query Classification Training Corpus Generation,” Proceedings of the 24$^{th}$ International Conference on Computing and Communications (ADCOM 2018), Sep. 22, 2018, retrieved from the Internet: https://accsindia.org/downloads/ADCOM-2018-papers/ADCOM_2018_paper_18.pdf, 4 pages.

Elena Manishina et al., “Automatic Corpus Extension for Data-Driven Natural Language Generation,” Proceedings of the Tenth International Conference on Language Resources and Evaluation (LREC’16), May 2016, pp. 3624-3631, retrieved from the Internet: https://www.aclweb.org/anthology/L16-1757.pdf.

European Search Report received in counterpart European Patent Application No. EP 1926455.8, dated May 18, 2020, 10 pages.

Sun et al., “Joint learning of question answering and question generation,” IEEE transactions on Knowledge and Data Engineering, Feb. 2109 6:32(5): 971-82.

Uma et al., “Formation of SQL from natural language query using NLP,” in 2019 International Conference on Computational Intelligence in Data Science (ICCIDS), Feb. 21, 2019, pp. 1-5.

Weerasooriya et al., “A method to extract essential keywords from a tweet using NLP tools,” 2016 Sixteenth International Conference on Advances in ICT for Emerging Regions (ICTer) Negombo, 2016, pp. 29-34.

Non-Final Office Action received in U.S. Appl. No. 17/573,498, filed Mar. 18, 2025, 35 pages.

* cited by examiner

300

800

1000

TRAINING DATASET GENERATION FOR SPEECH-TO-TEXT SERVICE

FIELD

The field generally relates to training a speech-to-text service.

BACKGROUND

Speech-to-text services have become increasingly prevalent in the online world. A typical speech-to-text service accepts audio input containing speech and generates text corresponding to the words spoken in the audio input. Such services can be quite effective because they allow users to interact with devices without having to type or otherwise manually input data. For example, contemporary speech-to-text services can be used to help execute automated tasks, look up information in a database, and the like.

In practice, a speech-to-text service can be created by providing training data to a speech recognition model. However, finding good training data can be a hurdle to developing an effective speech-to-text service.

DETAILED DESCRIPTION

Example 1—Overview

Traditional speech-to-text service training techniques can suffer from lack of a sufficient number of spoken examples for training. For example, a technique of generating training data by employing human speakers to generate spoken examples can be labor intensive, error prone, and involve legal issues. Further, the pristine sound conditions under which such examples are generated do not match the actual conditions under which speech recognition is actually performed. For example, the resulting trained service may have difficulty recognizing speech when certain factors such as background noise, dialects/accents, audio distortions, environmental abnormalities, and the like are in play. The problem is compounded when the service is required to recognize speech in a domain specific area that has esoteric vocabulary.

The problem is further compounded in multi-lingual environments, such as for multi-national entities that strive to support a large number of human languages in a wide variety of environments and recording/sampling situations.

Due to the limited number of available spoken examples, developers may shortchange or completely skip a validation of the speech-to-text service. The resulting quality of the deployed service can thus suffer accordingly.

As described herein, automated linguistic expression generation can be utilized to generate a large number of synthetic speech audio recordings that can serve as speech examples for training purposes. For example, a rich set of linguistic expressions can be generated and transformed into synthetic speech audio recordings for which the corresponding text is already known. Domain-specific vocabulary can be included to generate domain-specific speech-to-text services. The technique can be applied across a variety of languages as described herein.

Further, both pre-generation characteristics (e.g., accent and the like) as well as post-generation adjustments (e.g., addition of background noise and the like) can be applied so that the service supports a wide variety of environments, accents, and the like.

Due to the abundance of available synthetic speech audio recordings for which the corresponding text is already known, validation can be performed easily.

The described technologies thus offer considerable improvements over conventional techniques.

Figure 1:
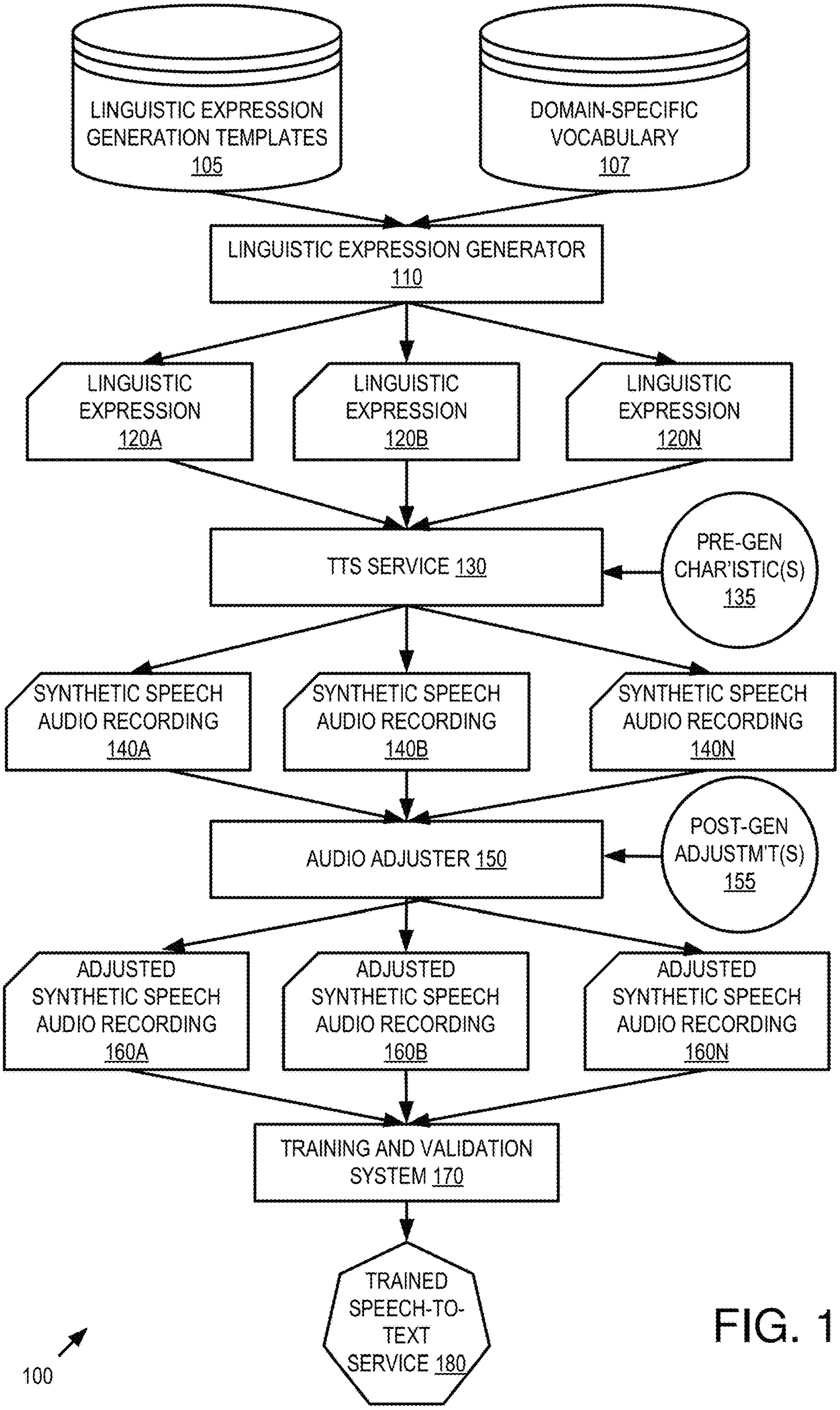
FIG. 1 is a block diagram of an example system implementing automated speech-to-text training data generation.

Example 2—Example System Implementing Automated Speech-to-Text Training Data Generation FIG. 1 is a block diagram of an example system 100 implementing automated speech-to-text training data generation. In the example, the system 100 can include a linguistic expression generator 110 that accepts linguistic expression generation templates 105 and domain-specific vocabulary 107 (e.g., a dictionary of domain-specific keywords) and generates linguistic expressions 120A-N as described herein.

The example system 100 can implement a text-to-speech ("TTS") service 130. The text-to-speech service 130 can utilize pre-generation characteristics 135 and linguistic expressions 120A-N and generate synthetic speech audio recordings 140A-N. As described herein, different pre-generation characteristics 135 can be applied to generate different respective synthetic speech audio recordings 140A-N (e.g., for the same or different linguistic expressions 120A-N).

An audio adjuster 150 can accept synthetic speech audio recordings 140A-N and post-generation adjustments 155 as input and generate adjusted synthetic speech audio recordings 160A-N. As described herein, different post-generation adjustments 155 can be applied to generate different respective adjusted synthetic speech audio recordings 160A-N (e.g., for the same or different synthetic speech audio recordings 140A-N). Post-generation adjustments 155 can include, for example, changing the speed of recording playback, adding background noise, adding acoustic distortions, changing sampling rate and/or audio quality, etc. Such adjustments can result in better training via a set of adjusted synthetic speech audio recordings 160A-N that cover a domain in a realistic environment (e.g., a user in traffic, a large manufacturing plant, an office building, a hospital, or the like).

In a training and validation system 170, subsets of the adjusted synthetic speech audio recordings 160A-N can be selected for training and validation of a speech-to-text service 180.

The trained speech-to-text service 180 can accurately assess speech inputs from a user and output corresponding text. For example, the service 180, can take into account a wide variety of environments, audio qualities, and the like.

The trained speech-to-text service 180 can be implemented as a domain-specific speech-to-text service due to the inclusion of domain-specific vocabulary 107. The inclusion of such vocabulary 107 can be particularly beneficial because a conventional speech-to-text service may fail to recognize utterances in audio recordings due to the omission of such vocabulary during training. The service 180 can thus support voice recognition in the domain used to generate the expressions (i.e., the domain of the domain-specific vocabulary 107).

In practice, the system can iterate the training over time to converge on an acceptable benchmark value (e.g., a value that indicates that an acceptable level of accuracy has been achieved).

In practice, the systems shown herein, such as system 100, can vary in complexity, with additional functionality, more complex components, and the like. For example, there can be additional functionality within the speech-to-text service 180. Additional components can be included to implement security, redundancy, load balancing, report design, and the like.

The described computing systems can be networked via wired or wireless network connections, including the Internet. Alternatively, systems can be connected through an intranet connection (e.g., in a corporate environment, government environment, or the like).

The system 100 and any of the other systems described herein can be implemented in conjunction with any of the hardware components described herein, such as the computing systems described below (e.g., processing units, memory, and the like). In any of the examples herein, the templates, expressions, audio recordings, services, validation results, and the like can be stored in one or more computer-readable storage media or computer-readable storage devices. The technologies described herein can be generic to the specifics of operating systems or hardware and can be applied in any variety of environments to take advantage of the described features.

Figure 2:
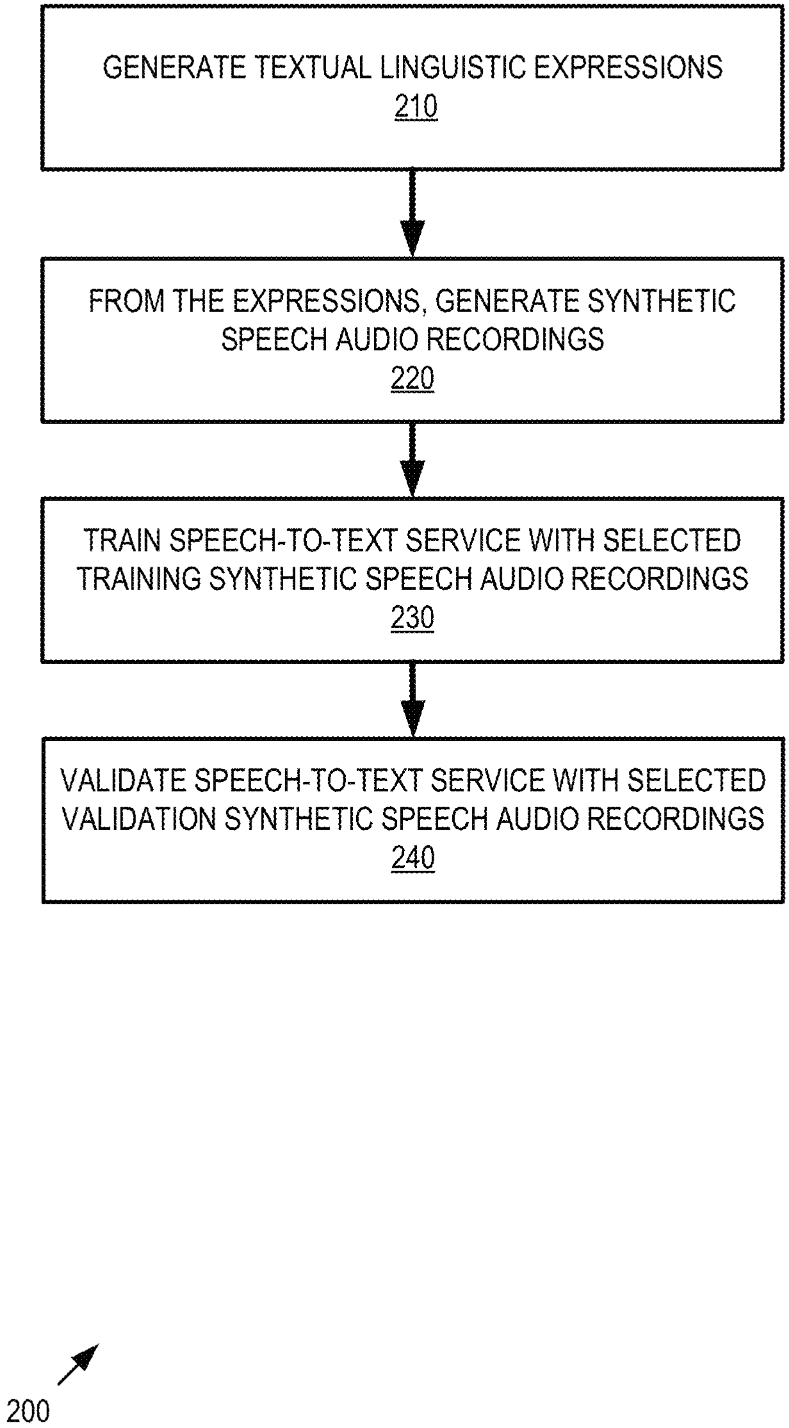
FIG. 2 is a flowchart of an example method of automated speech-to-text training data generation.

Example 3—Example Method Implementing Automated Speech-to-Text Training Data Generation FIG. 2 is a flowchart of an example method 200 of automated speech-to-text training data generation and can be performed, for example, by the system of FIG. 1. The automated nature of the method 200 allows rapid production of a large number of audio recordings for developing a speech-to-text service as described herein. Separately, the generation can be repeatedly and rapidly employed for various purposes, such as re-training the speech-to-text service, training a speech-to-text service in different human languages, training in a different domain, and the like.

In the example, at 210, based on a plurality of stored linguistic expression generation templates following a syntax, the method generates a plurality of generated linguistic expressions for developing a speech-to-text service. The generated linguistic expressions can have respective pre-categorized intents according to the template from which they were generated. For example, some of the linguistic expressions can be associated with a first intent, and some, other of the linguistic expressions can be associated with a second intent, and so on. As described herein, domain-specific vocabulary can be included as part of the generation process.

At 220, the method generates, from the plurality of generated linguistic expressions, a plurality of synthetic speech audio recordings with a text-to-speech service. As described herein, one or more pre-generation characteristics, one or more post-generation adjustments, or both can be applied. In practice, a number of adjusted synthetic speech audio recordings output from the text-to-speech service can be selected for training a speech-to-text service. Because the synthetic speech audio recordings were generated with known text, such text can be stored as associated with the synthetic speech audio recording and subsequently used during training or validation. The technology can thus implement automated text-to-speech service-based generation of speech-to-text service training data.

A database of named entities (e.g., domain-specific vocabulary) can be included as input as well as service metadata for each human language.

At 230, the speech-to-text service is trained with selected training adjusted synthetic speech audio recordings. In practice, a number of the training adjusted synthetic speech audio recordings can be selected for training the speech-to-text service and the remaining recordings are thus selected for validation. In practice, the training set is typically larger than the validation set. For example, a majority of the recordings can be selected for training, and the remaining used for validation and testing.

At 240, the trained speech-to-text service can be validated with selected validation synthetic audio speech recordings of the plurality of synthetic audio speech recordings. The validation can generate a benchmark value indicative of performance of the chatbot (e.g., a benchmark quantification). In practice, the method can iterate until the benchmark value reaches an acceptable value (e.g., a threshold).

The method 200 and any of the other methods described herein can be performed by computer-executable instructions (e.g., causing a computing system to perform the method) stored in one or more computer-readable media (e.g., storage or other tangible media) or stored in one or more computer-readable storage devices. Such methods can be performed in software, firmware, hardware, or combinations thereof. Such methods can be performed at least in part by a computing system (e.g., one or more computing devices).

The illustrated actions can be described from alternative perspectives while still implementing the technologies. For example, from the perspective of the text-to-speech service, a recording is provided as output; while, from the perspective of training, the recording is received as input.

Example 4—Example Synthetic Speech Audio Recording

In any of the examples herein, a synthetic speech audio recording can take the form of audio data that represents synthetically generated speech. As described herein, such recordings can be generated via a text-to-speech service by inputting original text (e.g., originating from a template). As described herein, domain-specific vocabulary can be included. In practice, a text-to-speech service iterates over an input string and transforms the input text into phonemes that are virtually uttered by the service by including audio data in the output that resembles that generated by a real human speaker.

In practice, the recording can be stored as a file, binary large object (BLOB), or the like.

The original text used to generate the recording can be stored as associated with the recording and subsequently used during training and validation (e.g., to determine whether a trained speech-to-text service correctly generates the text from the speech).

Example 5—Example Pre-Generation Characteristics

In any of the examples herein, pre-generation characteristics can be provided to a text-to-speech service and guide generation of synthetic speech audio recordings. Such pre-generation characteristics can include rate (e.g., speed) of speech, accent, dialect, voice type (e.g., style), speaker gender, and the like.

In any of the examples herein, a variety of different pre-generation characteristics can be used when generating synthetic speech audio recordings for training purposes to generate a more robust trained speech-to-text service. In practice, values of such characteristics can be varied over a range to generate a variety of different synthetic speech audio recordings, resulting in a more robust trained speech-to-text service.

Thus, one or more different pre-generation characteristics can be applied, different values for one or more pre-generation characteristics can be applied, or both. Values can be generated by selecting within a numerical range, selecting from a set of possibilities, or the like. In practice, randomization, weighted selection, or the like can be employed.

Example 6—Example Post-Generation Adjustments

In any of the examples herein, post-generation adjustments can be performed on synthetic speech audio recordings and adjusted synthetic speech audio recordings are generated. Such post-generation characteristics can include adjusting speed (e.g., slowing down or speeding up the recording), applying noise (e.g., simulated or real background noise), introducing acoustic distortions (e.g., simulated movement to and from a microphone), applying reverberation, changing sample rate, overall audio quality, and the like.

In any of the examples herein, a variety of different post-generation characteristics can be applied when generating synthetic speech audio recordings for training purposes to generate a more robust trained speech-to-text service. Such adjustments can result in better training via a set of adjusted synthetic speech audio recordings 160A-N that cover a domain in a realistic environment (e.g., in traffic, a large manufacturing plant, an office building, a hospital, a small room, outside, or the like).

Thus, one or more different post-generation adjustments can be applied, different values for one or more post-generation adjustments can be applied, or both. Values can be generated by selecting within a numerical range, selecting from a set of possibilities, or the like. In practice, randomization, weighted selection, or the like can be employed.

Example 7—Example Iteration

In any of the examples herein, the training process can be iterated to improve the quality of the generated speech-to-text service. For example, the training and validation can be repeated over multiple iterations as the audio recordings are modified/adjusted (e.g., attempted to be improved) and the benchmark converges on an acceptable value.

The training and validation can be iterated (e.g., repeated) until an acceptable benchmark value is met. Pre-generation characteristics, post-generation adjustments, and the like can be varied between iterations, converging on a superior trained service. Such an approach allows modifications to the templates until a suitable set of templates results in an acceptable speech-to-text service.

Example 8—Example Pre-Categorization

In any of the examples herein, the generated linguistic expressions generated can be pre-categorized in that the respective intent for the expression is already known. Such intent can be associated with the linguistic expression generation template from which the expression is generated. For example, the intent is copied from that of the linguistic expression template (e.g., "delete" or the like).

Such an arrangement can be beneficial in a system because the respective intent is already known and can be used if the speech input is used in a larger system such as a chatbot. For example, such an intent can be used as input to the training engine of the chatbot.

In practice, the intent can be used at runtime of the speech-to-text service to determine what task to perform. If a system can successfully recognize the correct intent for a given speech input, it is considered to be properly processing the given linguistic expression; otherwise, failure is indicated.

Example 9—Example Templates

In any of the examples herein, linguistic expression generation templates (or simply "templates") can be used to generate linguistic expressions for developing the speech-to-text service. As described herein, such templates can be stored in one or more non-transitory computer-readable media and used as input to an expression generator that outputs linguistic expressions for use with the speech-to-text service training and/or validation technologies described herein.

Figure 3:
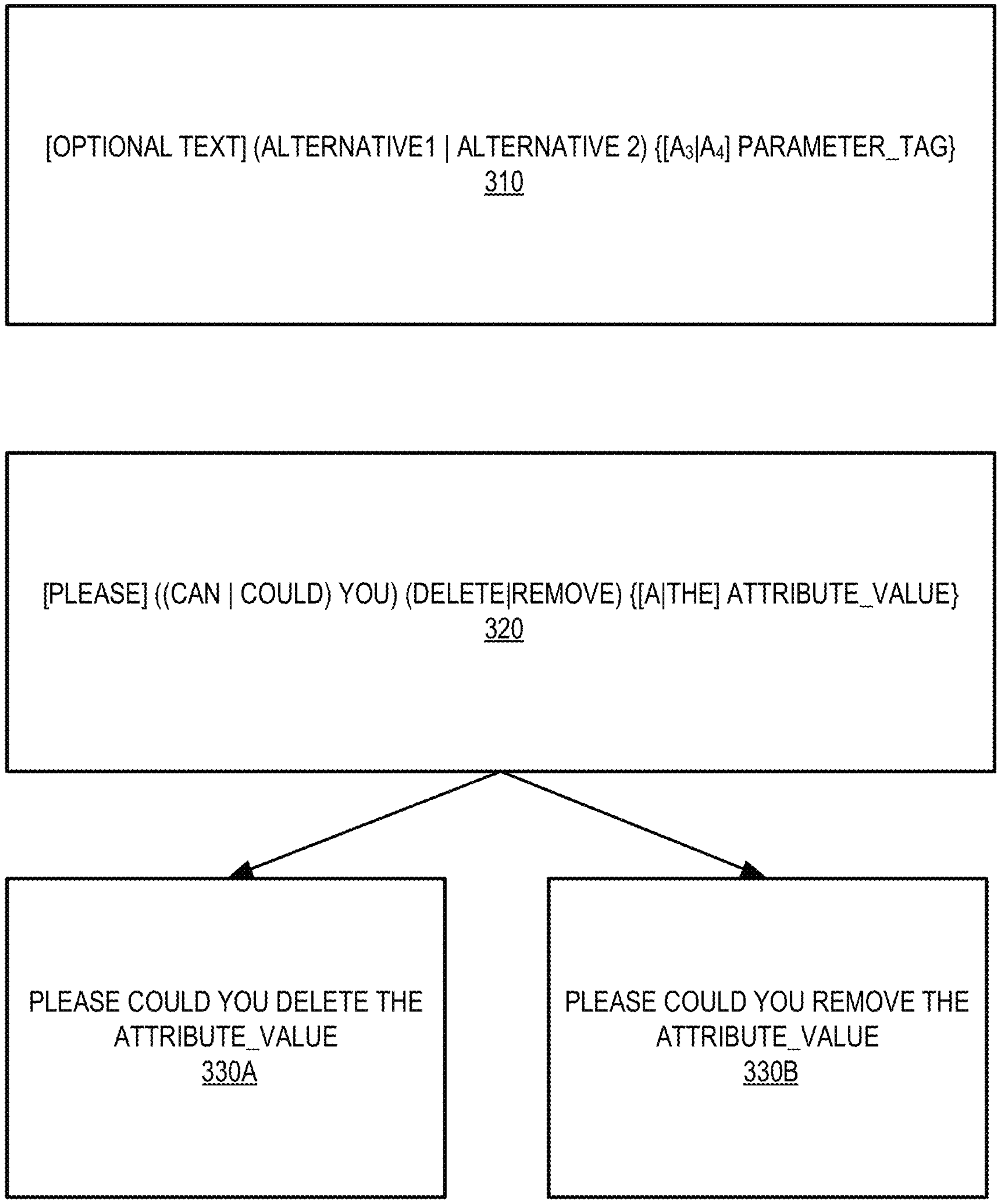
FIG. 3 is a block diagram showing example linguistic expression template syntax, an example actual template, and example linguistic expressions generated therefrom.

FIG. 3 is a block diagram showing example linguistic expression template syntax 310, an example actual template 320, and example linguistic expressions 330A-B generated therefrom.

In the example, the template syntax 310 supports multiple alternative phrases (e.g., in the syntax a plurality of alternative phrases can be specified, and the expression generator will pick one of them). The example shown uses a vertical bar "I" as a separator between parentheses, but other conventions can be used. In practice, the syntax is implemented as a grammar specification from which linguistic expressions can be generated.

In practice, the generator can choose from among the alternatives in a variety of ways. For example, the generator can generate an expression using each of the alternatives (e.g., all possible combinations for the expression). Other techniques can be to choose an expression at random, weighted choosing, and the like. The example template 320 incorporates at least one instance of multiple alternative phrases. In practice, there can be any number of multiple alternative phrases, leading to an explosion in the number of expressions that can be generated therefrom. For sake of example, two possibilities 330A and 330B are shown (e.g., "delete" versus "remove"); however, in practice, due to the number of other multiple alternative phrases, many more expressions can be generated.

Inclusion of domain-specific vocabulary (e.g., as attribute names, attribute values, business objects, or the like) can be implemented as described herein to train a domain-specific service. Templates can support reference to such values, which can be drawn from a domain-specific dictionary.

In the example, the template syntax 310 supports optional phrases. Optional phrases specify that a term can be (but need not be) included in generated expressions.

In practice, the generator can choose whether to include optional phrases in a variety of ways. For example, the generator can generate an expression with the optional phrase and generate another expression without the optional phrase. Other techniques can be to randomly choose whether to include the expression, weighted inclusion, and the like. The example template 320 incorporates an optional phrase. In practice, there can be any number of optional phrases, leading to further increase in the number of expressions that can be generated from the underlying template. Multiple alternative phrases an also be incorporated into the optional phrase mechanism, resulting in optional multiple alternative phrases (e.g., none of the options need to be incorporated into the expression, or one of the options can be incorporated into the template).

Figure 4:
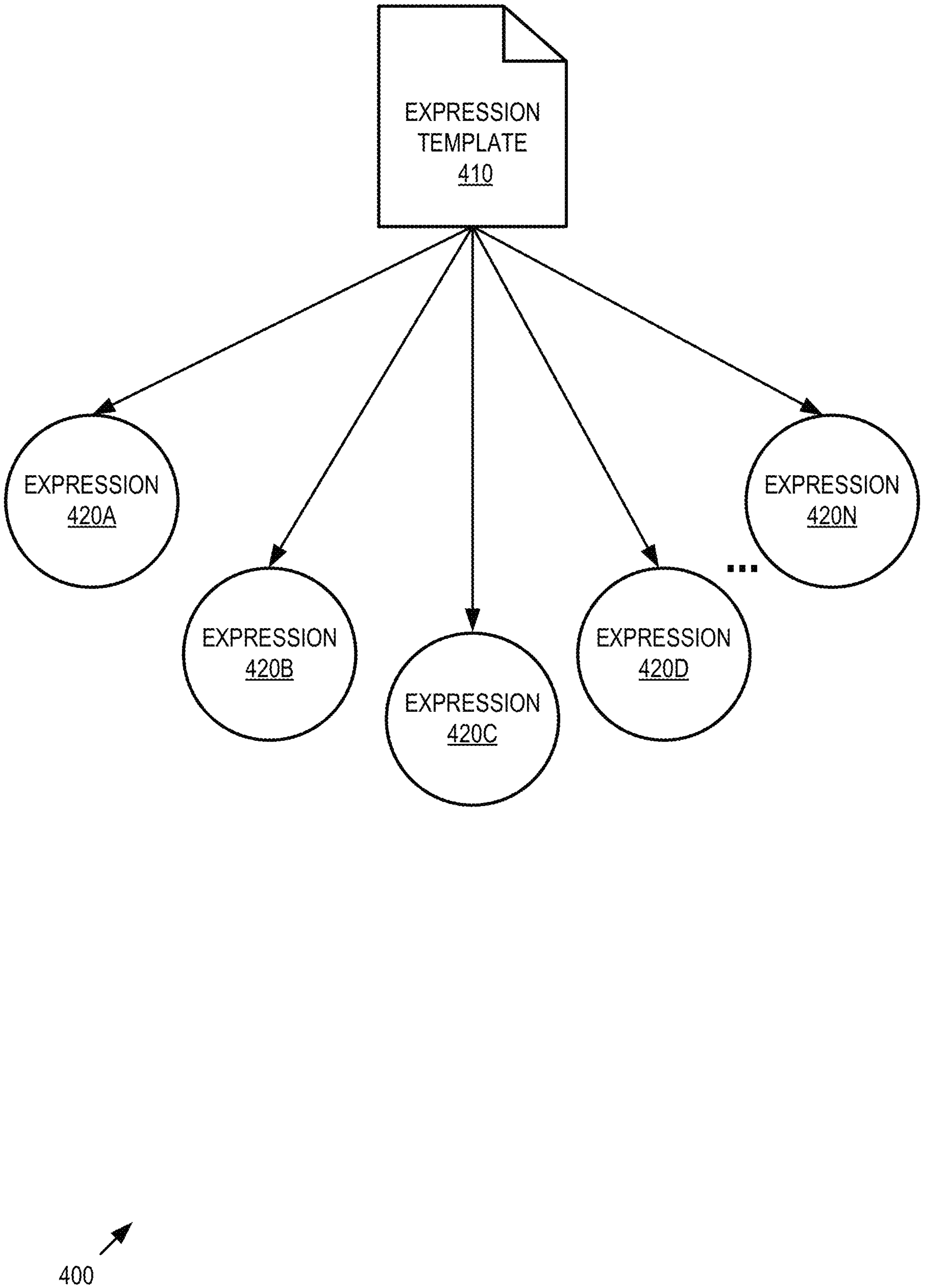
FIG. 4 is a block diagram showing numerous example linguistic expressions generated from an example linguistic expression template.

FIG. 4 is a block diagram showing numerous example linguistic expressions 420A-N generated from an example linguistic expression template 410. For example, a set of 20 templates can be used to generate about 60,000 different expressions.

If desired, the template text can be translated (e.g., by machine translation) to another human language to provide a set of templates for the other language or serve as a starting point for a set of finalized templates for the other language. The syntax elements (e.g., delimiters, etc.) need not be translated and can be left untouched by a machine translation.

Example 10—Additional Syntax

The syntax (e.g., 310) can support regular expressions. Such regular expressions can be used to generate templates.

An example syntax can support optional elements, 0 or more iterations, 1 or more iterations, from x to y iterations of specified elements (e.g., strings).

The syntax can allow pass-through of metacharacters that can be interpreted by downstream processing. Further grouping characters (e.g., "{" and "}") can be used to form blocks that are understood by other template rules as follows:

({[please] create}|{add [new]}) BUSINESS_OBJECT.

Example notation can include the following, but other arrangements are equally possible:

Elements
- [ ]: optional element
- *: 0 or more iterations
- +: 1 or more iterations
- {x, y}: from x to y iterations

Example 11—Additional Syntax: Dictionaries

Dictionaries can also be supported as follows:

Dictionaries
- ATTRIBUTE_NAME: supplier, price, name
- ATTRIBUTE_VALUE: Avantel, green, notebook
- BUSINESS_OBJECT: product, sales order Such dictionaries can include domain-specific vocabulary.

Example 12—Additional Template Syntax

Additional syntax can be supported as follows:

Elements
- < >: any token (word)
- [ ]: optional element
- *: 0 or more iterations
- +: 1 or more iterations
- {x, y}: from x to y iterations
- *SN*: beginning and end of a sentence or clause
- *SN strict*: beginning and end of a sentence Dictionaries
- ATTRIBUTE_NAME: supplier, price, name
- ATTRIBUTE_VALUE: Avantel, green, notebook
- BUSINESS_OBJECT: product CORE Entities
- CURRENCY: $10,999 euro
- PERSON: John Smith, Mary Johnson
- MEASURE: 1 mm, 5 inches
- DATE: Oct. 10, 2018
- DURATION: 5 weeks Parts of Speech and Phrases
- ADJECTIVE: small, green, old
- NOUN: table, computer
- PRONOUN: it, he, she
- NOUN_GROUP: box of nails

Example 13—Example Domain-Specific Vocabulary

In any of the examples herein, domain-specific vocabulary can be introduced when generating linguistic expressions and the resulting synthetic recordings. For example, business objects in a construction setting could include equipment names (e.g., shovel), construction-specific lingo for processes (e.g., OSHA inspection), or the like. By including such vocabulary in the training process, the resulting speech-to-text service is more robust and likely to accurately recognize domain-specific phrases, resulting in more efficient operation overall.

Any domain-specific keywords can be included in templates, dictionary sources for the templates, or the like. For example, domain-specific vocabulary can be implemented by including nouns, objects, or the like that are likely to be manipulated during operations in the domain. For example, "drop off location" may be used as an object across operations (e.g., "create a drop off location," "edit the drop off location," or the like. Thus, domain-specific nouns can be included. Such nouns can be included as a vocabulary separate from templates (e.g., as an attribute name, attribute value, or business object). Such nouns of objects acted upon in a particular domain can be stored in a dictionary of domain-specific vocabulary (e.g., effectively a domain-specific dictionary). Subsequently, the domain-specific vocabulary can be applied when generating the plurality of generated textual linguistic expressions. For example, a template can specify that an attribute name, attribute value, or business object is to be included. Such text can be drawn from the domain-specific dictionary.

Similarly, domain-specific verbs, actions, and operations can be implemented. For example, a "delete" action may be called "cut." In such a case, domain-specific vocabulary can be achieved by including "cut" in a "delete" template (e.g., "cut the work order"). Thus, domain-specific verbs can be included.

In practice, such techniques can be used alone or combined to provide a rich set of domain-specific training samples so that the resulting speech-to-text service can function well in the targeted domain.

In practice, a domain can be any subject matter area that develops its own vocabulary. For example, automobile manufacturing can be a different domain from agricultural products. In practice, different business units within an organization can also be categorized as domains. For example, the accounting department can be a different domain from the human resources department. The level of granularity can be further refined according to specialization, for example inbound logistics may be a different domain from outbound logistics. Combined services can be generated by including combined vocabulary from different domains or intersecting domains.

A domain-specific dictionary can be stored as a separate dictionary or combined into a general dictionary that facilitates extraction of domain-specific vocabulary from the dictionary upon specification of a particular domain. In practice, the dictionary can be a simple word list or a list of words under different categories (e.g., a list of attribute names particular to the domain, a list of attribute values particular to the domain, a list of business objects particular to the domain, or the like). Such categories can be explicitly represented in templates (e.g., as an "ATTRIBUTE_NAME" tag or the like), and linguistic expressions generated from the templates can choose from among the possibilities in the dictionary.

Example 14—Example Intents

In any of the examples herein, the system can support a wide variety of intents. The intents can vary based on the domain in which the speech-to-text service operates and are not limited by the technologies described herein. For example, in a software development domain, the intents may include "delete," "create," "update," "read," and the like. A generated expression can have a pre-categorized intent, which can be sourced from the templates (e.g., the template used to generate the expression is associated with the intent).

In any of the examples herein, expressions can be pre-categorized in that an associated intent is already known for respective expressions. From a speech-to-text perspective, the incoming linguistic expression can be mapped to an intent. For example, "submit new leave request" can map to "create." "Show my leave requests" can map to "read."

In practice, any number of other intents can be used for other domains, and they are not limited in number or subject matter.

In practice, it is time consuming to provide sample linguistic expressions for the different intents because a developer must generate many samples for training and even more for validation. If validation is not successful, the process must be done again.

Example 15—Example Synthetic Speech Audio Recording Generation System

Figure 5:
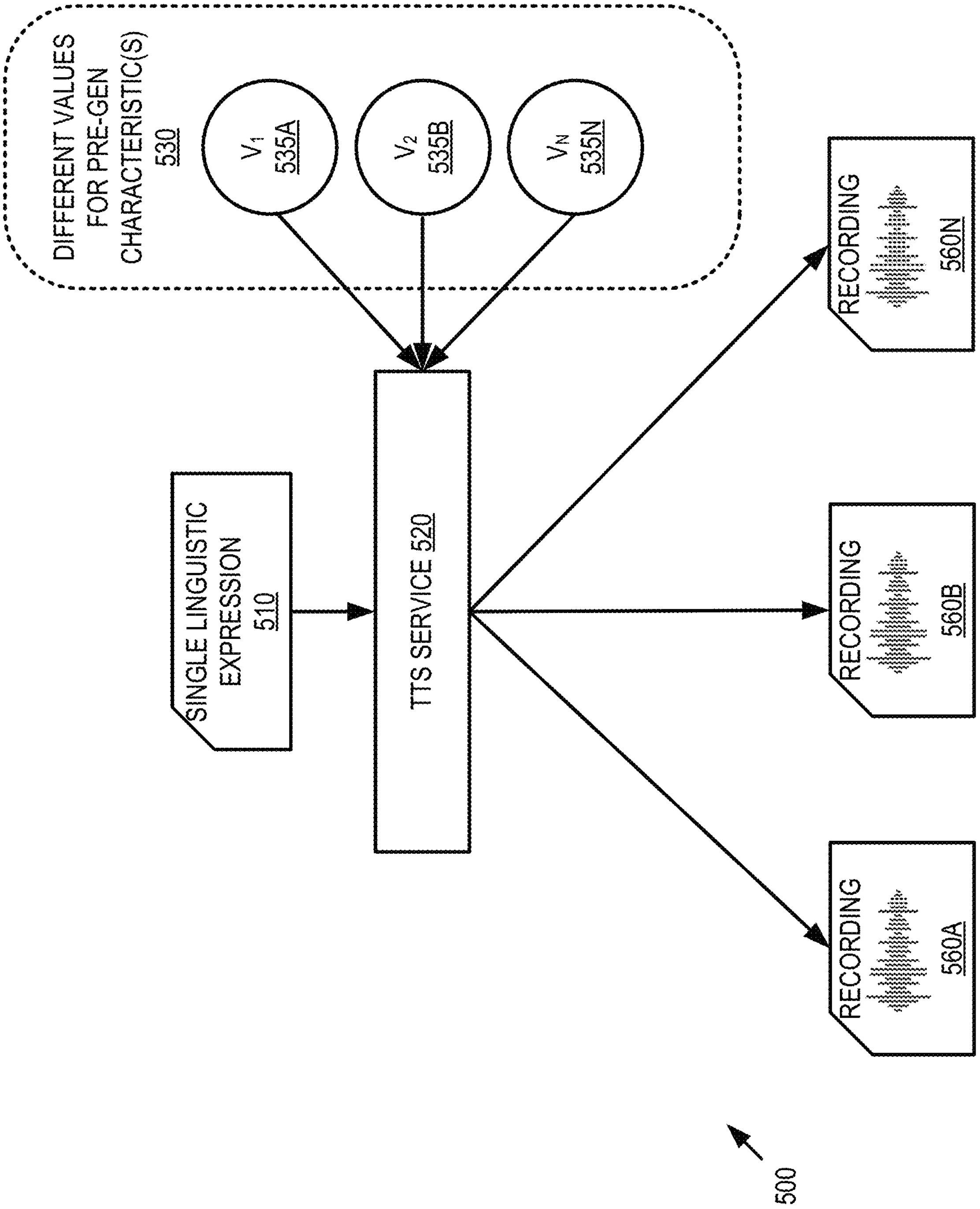
FIG. 5 is a block diagram of an example synthetic speech audio recording generation system employing a text-to-speech service to generate synthetic speech audio recordings from a single linguistic expression associated with original text using different values for pre-generation characteristics.

FIG. 5 is a block diagram of an example synthetic speech audio recording generation system 500 employing a text-to-speech service 520, which can generate synthetic speech audio recordings 560A-N from a single linguistic expression 510 (e.g., text generated from a template as described herein) associated with original text using different values 535A-N for pre-generation characteristics 530. In practice, there can be more recordings (e.g., per expression and overall) and more original text than that shown.

In practice, the different values 535A-N can reflect a particular aspect of the pre-generation characteristics 530. For example, the different values 535A-N can be used for gender, accent, speed, etc.

Multiple versions of the same phrase can be generated by varying pre-generation characteristics (e.g., the one or more characteristics applied, values for the one or more characteristics applied, or both) across the phrase.

Example 16—Example Speech-to-Text Service Development

Figure 6:
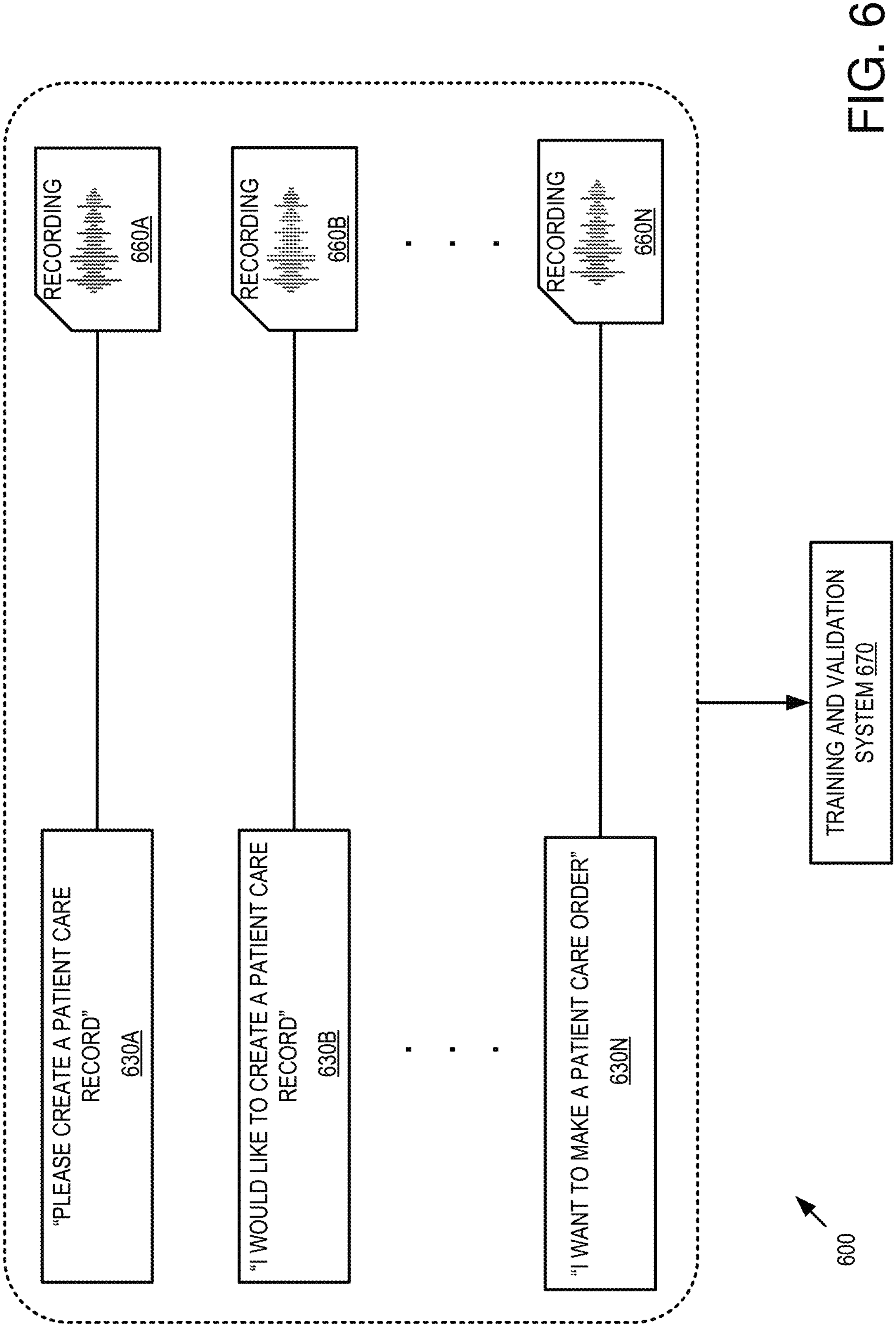
FIG. 6 is a block diagram showing example synthetic speech audio recordings generated from linguistic expressions.

FIG. 6 is a block diagram showing example synthetic speech audio recordings 660A-N generated from their respective linguistic expressions 630A-N; such an arrangement can be accomplished and can be performed, for example, by the system 500 of FIG. 5.

In practice, synthetic speech audio recording 660A can reflect the text of the linguistic expression 630A. For example, synthetic speech audio recording 660A may comprise a recording of the text "please create a patient care record," as shown in linguistic expression 630A.

As shown, the original text 630A-N associated with the recording 660A-N can be preserved for use during training and validation. The original text is linked (e.g., mapped) to the recording for training and validation purposes.

In practice, synthetic speech audio recordings 660A-N can be ingested by a training and validation system 670 (e.g., the training and validation system 170 of FIG. 1 or the like).

Example 17—Example Synthetic Speech Audio Recording Adjuster

Figure 7:
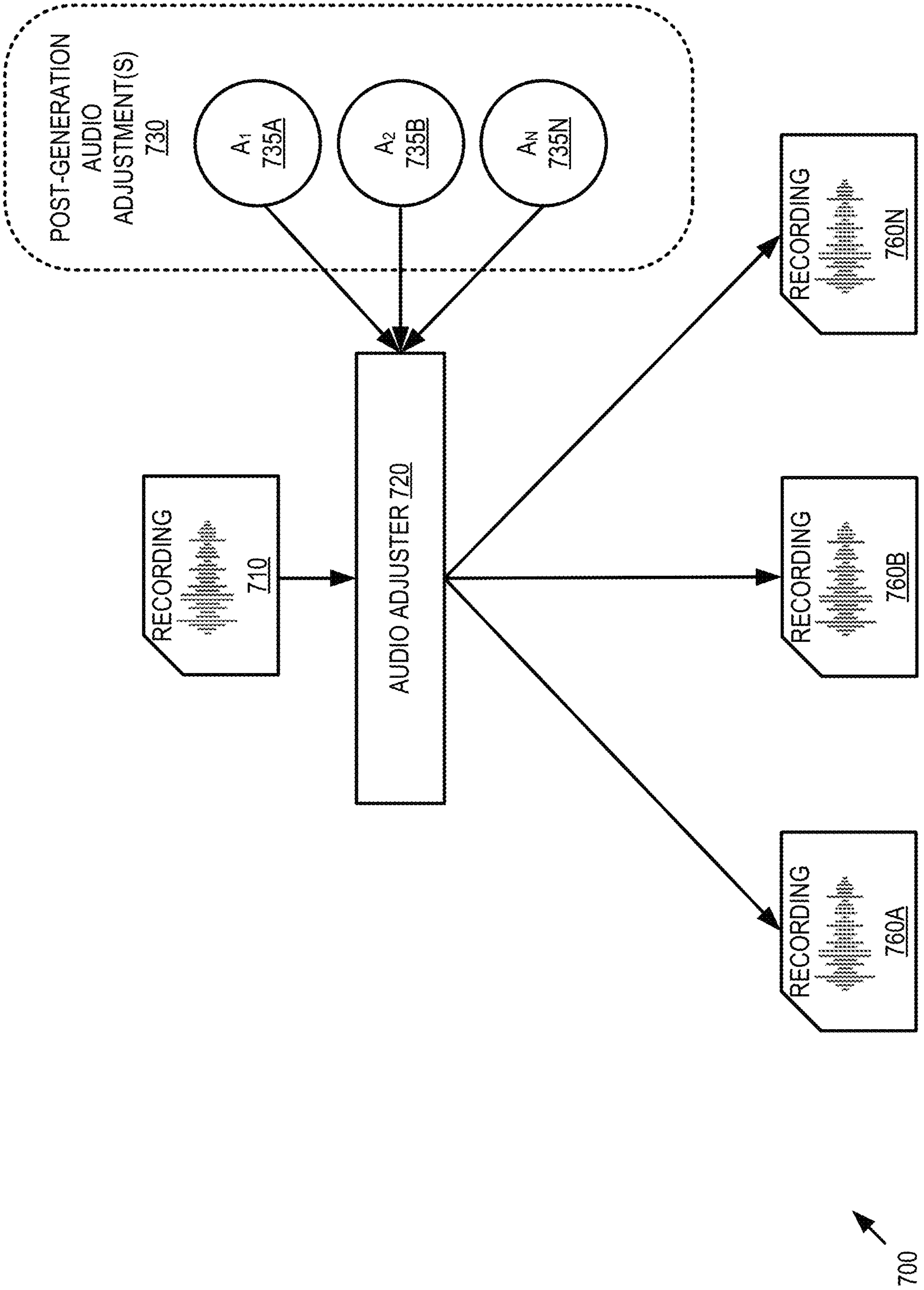
FIG. 7 is a block diagram of an example audio adjuster for synthetic speech audio recordings.

FIG. 7 is a block diagram of an example audio adjuster 720 for synthetic speech audio recordings 710 that achieves post-generation adjustments. Audio adjuster 720 can ingest a single synthetic speech audio recording 710, which can generate adjusted synthetic speech audio recordings 760A-N using different post-generation adjustments 735A-N for post-generation audio adjustments 730. In practice, there can be more adjusted recordings (e.g., per synthetic speech audio recording and overall) than that shown.

In practice, the different adjustments 735A-N can reflect a particular aspect of the post-generation adjustments 730. For example, the different adjustments 735A-N can be applying background noise, manipulating playback speed, adding dialects/accents, esoteric terminology, audio distortions, environmental abnormalities, etc.

The audio adjuster 720 can iterate over the input recording 710, applying the indicated adjustment(s). For example, the adjuster 720 can start at the beginning of the data and process a window of audio data as it moves to the end of the data while applying the indicated adjustment(s). Convolution, augmentation, and other techniques can be implemented by the adjuster 720.

Example 18—Example User Interface for Selecting Domain

Figure 8:
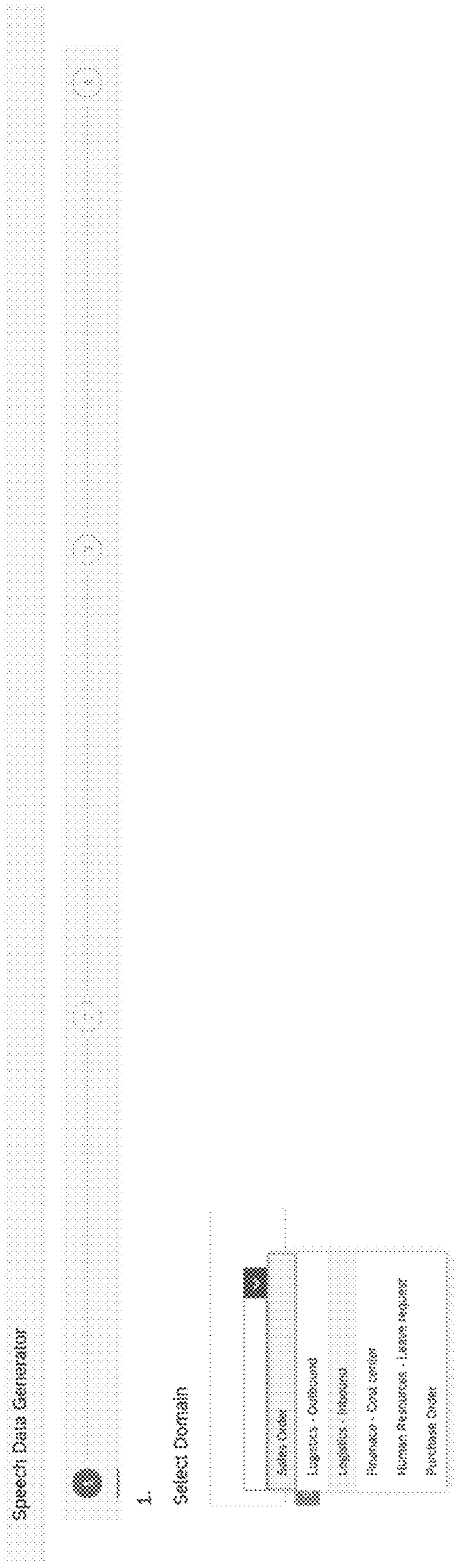
FIG. 8 is a screenshot of an example user interface for selecting a domain in automated speech-to-text training data generation.

FIG. 8 is a screenshot of an example user interface 800 that can be used in any of the examples herein for selecting a domain in automated speech-to-text training data generation. In the example, the user is presented with a plurality of possible domain names. A domain name is selected via the dropdown menu as shown.

A database corresponding to the domain of the domain stores domain-specific vocabulary and is then used as input to linguistic expression generation (e.g., the template can choose from the domain-specific vocabulary). Subsequently, synthetic recordings as described herein can be generated and used for training and validation purposes.

In practice, a target domain for the speech-to-text service can be received. Generating the textual linguistic expression can comprise applying keywords from the target domain. For example, domain-specific verbs can be included in the templates; a dictionary of domain-specific nouns can be used during generation of linguistic expressions from the templates; or both.

Example 19—Example User Interface for Selecting Expression Templates

Figure 9:
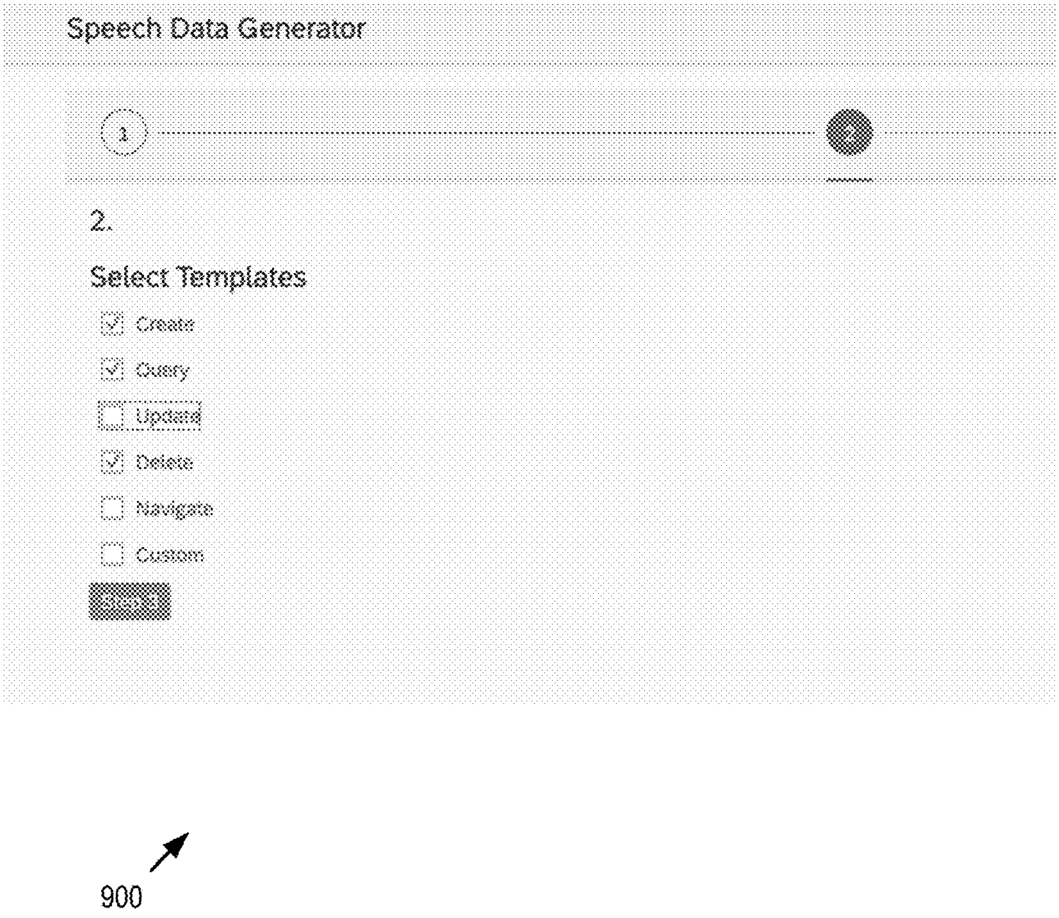
FIG. 9 is a screenshot of an example user interface for selecting expression templates in automated speech-to-text training data generation.

FIG. 9 is a screenshot of an example user interface 900 that can be used in any of the examples herein for selecting expression templates in automated speech-to-text training data generation. In the example, a plurality of template groups are shown, and a user can select which are to be used (e.g., via checkboxes).

Responsive to selection, the indicated template groups are included during linguistic expression generation (e.g., templates from the indicated groups are used for linguistic expression generation). Subsequently, synthetic recordings as described herein can be generated and used for training and validation purposes.

Example 20—Example User Interface for Applying Parameters

Figure 10:
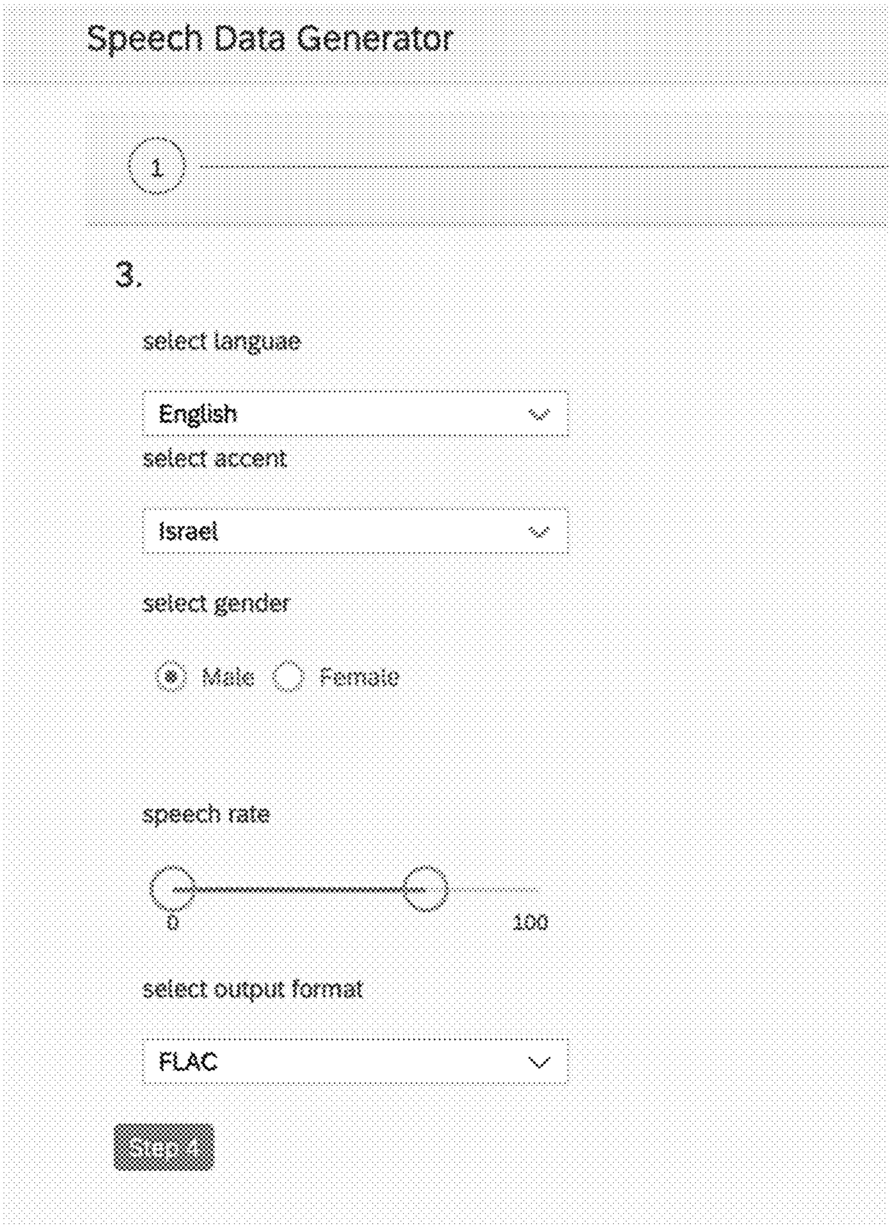
FIG. 10 is a screenshot of an example user interface for applying parameters, including pre-generation characteristics in automated speech-to-text training data generation.

FIG. 10 is a screenshot of an example user interface 1000 that can be used in any of the examples herein for applying parameters, including pre-generation characteristics in automated speech-to-text training data generation.

In the example, a user interface receives a user selection of human language (e.g., English, German, Italian, French, Hindi, Chinese, or the like). The user interface also receives an indicated accent (e.g., Israel), gender (e.g., male), speech rate (e.g., a percentage) and a desired output format.

Responsive to selection of an accent, the accent can be used as a pre-generation characteristic. For example, if a single accent is used, then the speech-to-text service can be trained as an accent-specific service. If a plurality of accents are used, then the speech-to-text service can be trained to recognize multiple accents. Gender selection is similar.

Example 21—Example User Interface for Applying Background Noise

Figure 11:
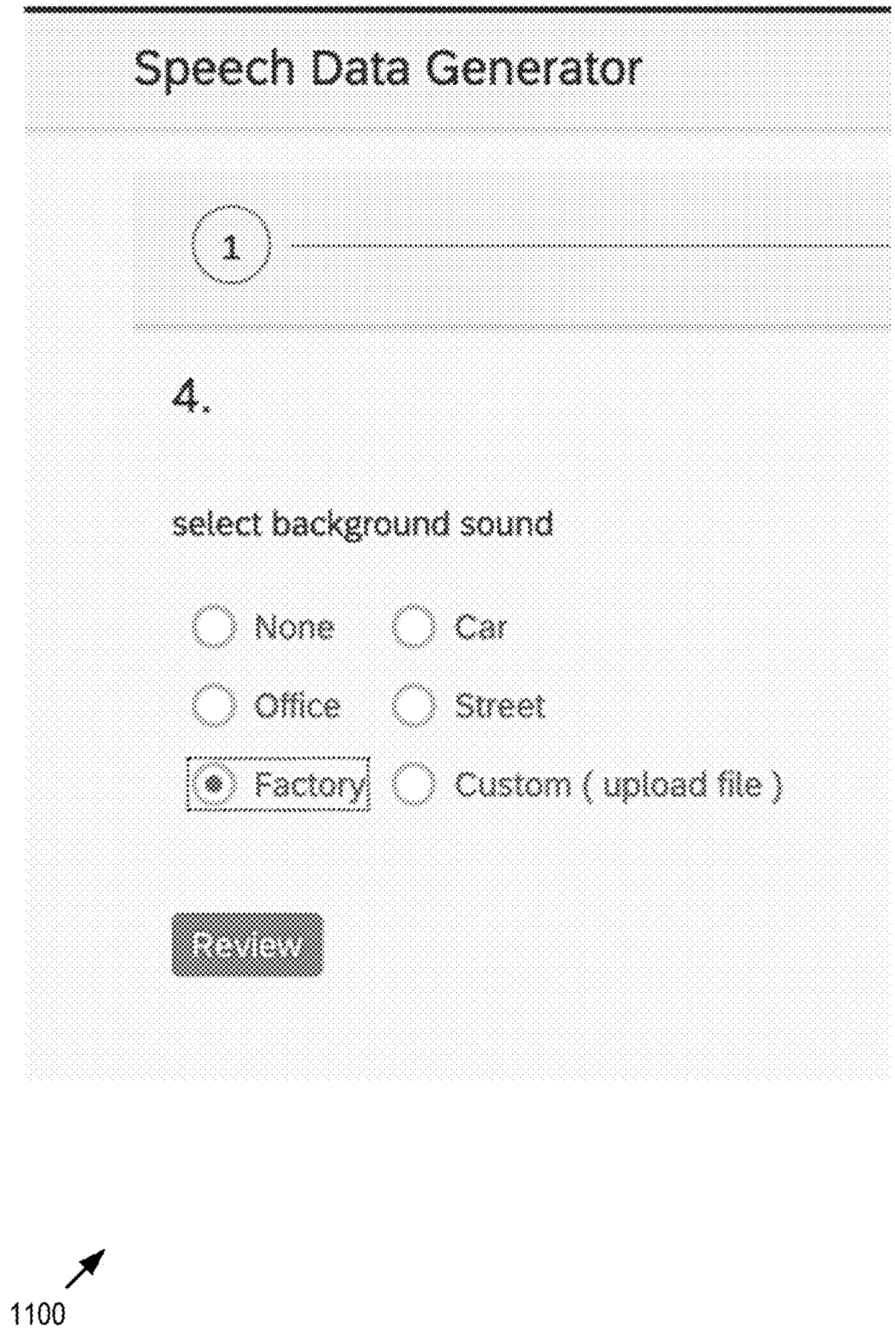
FIG. 11 is a screenshot of an example user interface for applying background noise as a post-generation adjustment in automated speech-to-text training data generation.

FIG. 11 is a screenshot of an example user interface 1100 that can be used in any of the examples herein for applying background noise as a post-generation adjustment in automated speech-to-text training data generation. In the example, an indication of a type of post-generation adjustment (e.g., background sound) can be received and applied during synthetic recording generation. As shown, a custom background noise can be uploaded for application against recordings.

Figure 12:
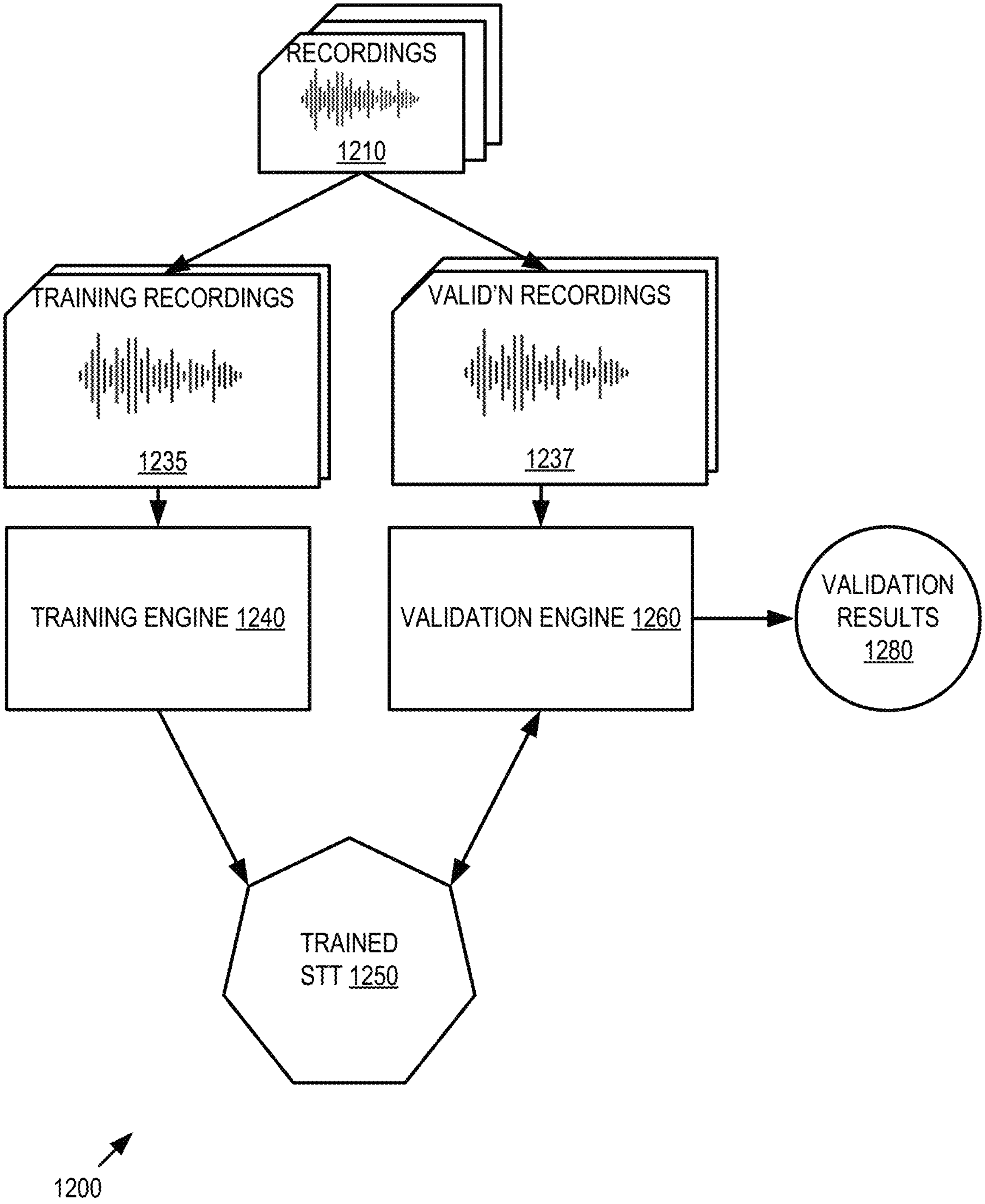
FIG. 12 is a block diagram of an example system for training and validating an automated speech-to-text service.

Example 22—Example System for Training and Validating an Automated Speech-to-Text Service FIG. 12 is a block diagram of an example system 1200 for training and validating an automated speech-to-text service.

In practice, a number of training recordings 1235 can be selected from a set of adjusted synthetic speech audio recordings 1210 for training the automated speech-to-text service by training engine 1240.

Further, a number of validation recordings 1237 can be selected from the set of adjusted synthetic speech audio recordings 1210 for validating the trained speech-to-text service 1250 by validation engine 1260. For example, the remaining recordings can be selected. Additional recordings can be set aside for testing if desired.

In practice, validation results 1280 may comprise, for example, benchmarking metrics for determining whether and when the trained speech-to-text service 1250 has been trained sufficiently.

Example 23—Example Adjusted Synthetic Speech Audio Recording Selection

In any of the examples herein, selecting which adjusted synthetic audio recordings to use for which phases of the development can be varied. In one embodiment, a small amount (e.g., less than half, less than 25%, less than 10%, less than 5%, or the like) of available recordings are selected for the training set, and the remaining ones are used for validation. In another embodiment, overlap between the training set and the validation set is permitted (e.g., a small amount of available recordings are selected for the training set, and all of them or filtered ones are used for validation). Any number of other arrangements are possible based on the validation methodology and developer preference. Such selection can be configured by user interface (e.g., one or more sliders) if desired.

Example 24—Example Adjusted Synthetic Speech Audio Recording Filtering

In any of the examples herein, it may be desirable to filter out some of the adjusted synthetic speech audio recordings. In some cases, such filtering can improve confidence in the developed service.

For example, a linguistic distance calculation can be performed on the available adjusted synthetic speech audio recordings. Some adjusted synthetic speech audio recordings that are very close to (e.g., linguistically similar to) one or more others can be removed.

Such filtering can be configurable to remove a configurable number (e.g., absolute number, percentage, or the like) of adjusted synthetic speech audio recordings from the available adjusted synthetic speech audio recordings.

An example of such a linguistic difference calculation is the Levenshtein distance (e.g., edit distance), which is a string metric for indicating the difference between two sequences used to generate the recording. Distance can be specified in number of tokens (e.g., characters, words, or the like).

For example, a configuring user may specify that a selected number or percentage of the adjusted synthetic speech audio recordings that are very similar should be removed from use during training and/or validation.

Example 25—Example Fine Tuning

In any of the examples herein, the developer can fine tune development of the service by specifying what percentage of adjusted synthetic speech audio recordings to use in the training set and the distance level (e.g., edit distance) of text used to generate the recordings.

For example, if the distance is configured to less than 3 tokens, then "please create the object" is considered to be the same as "please create an object," and only one of them will be used for training.

Example 26—Example Benchmark

In any of the examples herein a variety of benchmarks can be used to measure quality of the service. Any one or more of them can be measured during validation.

For example, the number of accurate speech-to-text service outputs can be quantified as a percentage or other rating. Other benchmarks can be response time, number of failures or crashes, and the like. As described herein, the original text linked to a recording can be used to determine whether the service correctly recognized the speech in the recording.

In practice, one or more values are generated as part of the validation process, and the values can be compared against benchmark values to determine whether the performance of the service is acceptable. As described herein, a service that fails validation can be re-developed by modifying the adjustments.

For example, one or more benchmark values that can be calculated during validation include accuracy, precision, recall, F1 score, or combinations thereof.

Accuracy can be a global grade on the performance of the service. Accuracy can be the proportion of successful classifications out of the total predictions conducted during the benchmark.

Precision can be a metric that is calculated per output. For each output, it measures the proportion of correct predictions out of all the times the output was declared during the benchmark. It answers the question "Out of all the times the service predicted this output, how many times was it correct?" Low precision usually signifies the relevant output needs cleaning, which means removing sentences that do not belong to this output.

Recall can also be a metric calculated per output. For each output, it measures the proportion of correct predictions out of all the entries belonging to this output. It answers the question "Out of all the times my service was supposed to generate this output, how many times did it do so?" Low recall usually signifies the relevant service needs more training, for example, by adding more sentences to enrich the training.

F1 score can be the harmonic mean of the precision and the recall. It can be a good indication for the performance of each output and can be calculated to range from 0 (bad performance) to 1 (good performance). The F1 scores for each output can be averaged to create a global indication for the performance of the service.

Other metrics for benchmark values are possible.

Validation can also continue after using the expressions described herein.

As described herein, the benchmark can be used to control when development iteration ceases. For example, the development process (e.g., training and validation) can continue to iterate until the benchmark meets a threshold level (e.g., a level that indicates acceptable performance of the service).

Example 27—Example Speech-to-Text Service

In any of the examples herein, a speech-to-text service can be implemented via any number of architectures.

In practice, the speech-to-text service can comprise a speech recognition engine and an underlying internal representation of its knowledge base that is developed based on training data. It is the knowledge base that is typically validated because the knowledge base can be altered by additional training or re-training.

The service can accept user input in the form of speech (e.g., an audio recording) that is then recognized by the speech recognition engine (e.g., as containing spoken content, which is output as a character string). The speech recognition engine can extract parameters from the user input to then act on it.

For example, a user may say "could you please cancel auto-renew," and the speech recognition engine can output the string "could you please cancel auto-renew."

In practice, the speech-to-text service can include further elements, such as those for facilitating use in a cloud environment (e.g., microservices, configuration, or the like). The service thus provides easy access to the speech recognition engine that performs the actual speech recognition. Any number of known speech recognition architectures can be used without impacting the benefits of the technologies described herein.

Example 28—Example Linguistic Expression Generator

In any of the examples described herein, a linguistic expression generator can be used to generate expressions for use in training and validation of a service.

In practice, the generator iterates over the input templates. For each template, it reads the template and generates a plurality of output expressions based on the template syntax. The output expressions are then stored for later generation of synthetic recordings that can be used at a training or validation phase.

Example 29—Example Training Engine

In any of the examples herein, a training engine can train a speech-to-text service.

In practice, the training engine iterates over the input recordings. For each recording, it applies the recording and the associated known expression (i.e., text) to a training technique that modifies the service. When it is finished, the trained service is output for validation. In practice, an internal representation of the trained service (e.g., its knowledge base) can be used for validation.

Example 30—Example Validation Engine

In any of the examples herein, a validation engine can validate a trained service or its internal representation.

In practice, the validation engine can iterate over the input recordings. For each recording, it applies the recording to the trained service and verifies that the service output the correct text. Those instances where the service chose the correct output and those instances where the service chose an incorrect output (or chose no output at all) are differentiated. A benchmark can then be calculated as described herein based on the observed behavior of the service.

Example 31—Example Linguistic Expression Generation Templates

The following provides non-limiting examples of linguistic expression generation templates that can be used to generate linguistic expressions for use in the technologies described herein. In practice, the templates will vary according to use case and/or domain. The examples relate to the following operations (i.e., intents), but any number of other intents can be supported:

Query
Delete
Create
Update
Sorting

Templates for dialog types, attribute value pair, reference, and modifier are also supported.

TABLE 1

| Example Templates |
| --- |
| QUERY |
| [please] [(can ∣ could ∣ would) you] [please] |
| (display ∣ list ∣ show ∣ pull ∣ choose ∣ indicate ∣ calculate ∣ find ∣ locate ∣ filter ∣ give ∣ share ∣ provide ∣ search ∣ audit ∣ examine ∣ check ∣ inspect ∣ peruse ∣ review ∣ see ∣ survey ∣ view ∣ query ∣ bring up ∣ tell me ∣ look for ∣ have [a] look at ∣ check out ∣ get an update ∣ get [some] [more] info[rmation]) {[PREPOSITION] [a ∣ the] ATTRIBUTE_VALUE ∣ BUSINESS_OBJECT} |
| [please] [is it (possible ∣ ok) to] [please] |
| (display ∣ list ∣ show ∣ pull ∣ choose ∣ indicate ∣ calculate ∣ find ∣ locate ∣ filter ∣ give ∣ share ∣ provide ∣ search ∣ audit ∣ examine ∣ check ∣ inspect ∣ peruse ∣ review ∣ see ∣ survey ∣ view ∣ query ∣ bring up ∣ tell me ∣ look for ∣ have [a] look at ∣ check out ∣ get an update ∣ get [some] [more] info[rmation]) {[PREPOSITION] [a ∣ the] ATTRIBUTE_VALUE ∣ BUSINESS_OBJECT} |
| is there (a ∣ any) way to |
| (display ∣ list ∣ show ∣ pull ∣ choose ∣ indicate ∣ calculate ∣ find ∣ locate ∣ filter ∣ give ∣ share ∣ provide ∣ search ∣ audit ∣ examine ∣ check ∣ inspect ∣ peruse ∣ review ∣ see ∣ survey ∣ view ∣ query ∣ bring up ∣ tell me ∣ look for ∣ have [a] look at ∣ check out ∣ get an update ∣ get [some] [more] info[rmation]) {[PREPOSITION] [a ∣ the] ATTRIBUTE_VALUE ∣ BUSINESS_OBJECT} |
| is there (a ∣ any) way (I ∣ one) (can ∣ could ∣ might) |
| (display ∣ list ∣ show ∣ pull ∣ choose ∣ indicate ∣ calculate ∣ find ∣ locate ∣ filter ∣ give ∣ share ∣ provide ∣ search ∣ audit ∣ examine ∣ check ∣ inspect ∣ peruse ∣ review ∣ see ∣ survey ∣ view ∣ query ∣ bring up ∣ tell me ∣ look for ∣ have [a] look at ∣ check out ∣ get an update ∣ get [some] [more] info[rmation]) {[PREPOSITION] [a ∣ the] ATTRIBUTE_VALUE ∣ BUSINESS_OBJECT} |
| [I] (need ∣ request ∣ want) [to] |
| (audit ∣ examine ∣ check ∣ inspect ∣ peruse ∣ review ∣ see ∣ survey ∣ view ∣ query ∣ have [a] look at ∣ check out ∣ get an update ∣ get [some] [more] info[rmation]) {[PREPOSITION] [a ∣ the] ATTRIBUTE_VALUE ∣ BUSINESS_OBJECT} |
| [I] (would ∣ 'd) like [to] |
| (audit ∣ examine ∣ check ∣ inspect ∣ peruse ∣ review ∣ see ∣ survey ∣ view ∣ query ∣ have [a] look at ∣ check out ∣ get an update ∣ get [some] [more] info[rmation]) {[PREPOSITION] [a ∣ the] ATTRIBUTE_VALUE ∣ BUSINESS_OBJECT} |
| [I] must (audit ∣ examine ∣ check ∣ inspect ∣ peruse ∣ review ∣ see ∣ survey ∣ view ∣ query ∣ have [a] look at ∣ check out ∣ get an update ∣ get [some] [more] info[rmation]) {[PREPOSITION] [a ∣ the] ATTRIBUTE_VALUE ∣ BUSINESS_OBJECT} |
| [I] (have ∣ need) a plan to |
| (audit ∣ examine ∣ check ∣ inspect ∣ peruse ∣ review ∣ see ∣ survey ∣ view ∣ query ∣ have [a] look at ∣ check out ∣ get an update ∣ get [some] [more] info[rmation]) {[PREPOSITION] [a ∣ the] ATTRIBUTE_VALUE ∣ BUSINESS_OBJECT} |
| [I] (will ∣ 'll) (audit ∣ examine ∣ check ∣ inspect ∣ peruse ∣ review ∣ see ∣ survey ∣ view ∣ query ∣ have [a] look at ∣ check out ∣ get an update ∣ get [some] [more] info[rmation]) {[PREPOSITION] [a ∣ the] ATTRIBUTE_VALUE ∣ BUSINESS_OBJECT} |
| [I] (am ∣ 'm) (about ∣ going ∣ planning) to ∣ on |
| (audit ∣ examine ∣ check ∣ inspect ∣ peruse ∣ review ∣ see ∣ survey ∣ view ∣ query ∣ have [a] look at ∣ check out ∣ get an update ∣ get [some] [more] info[rmation]) {[PREPOSITION] [a ∣ the] ATTRIBUTE_VALUE ∣ BUSINESS_OBJECT} |
| I'm gonna (audit ∣ examine ∣ check ∣ inspect ∣ peruse ∣ review ∣ see ∣ survey ∣ view ∣ query ∣ have [a] look at ∣ check out ∣ get an update ∣ get [some] [more] info[rmation]) {[PREPOSITION] [a ∣ the] ATTRIBUTE_VALUE ∣ BUSINESS_OBJECT} |
| (can ∣ could ∣ may) I [please] |
| (audit ∣ examine ∣ check ∣ inspect ∣ peruse ∣ review ∣ see ∣ survey ∣ view ∣ query ∣ have [a] look at ∣ check out ∣ get an update ∣ get [some] [more] info[rmation]) {[PREPOSITION] [a ∣ the] ATTRIBUTE_VALUE ∣ BUSINESS_OBJECT} |
| is it possible to |
| (audit ∣ examine ∣ check ∣ inspect ∣ peruse ∣ review ∣ see ∣ survey ∣ view ∣ query ∣ have [a] look at ∣ check out ∣ get an update ∣ get [some] [more] info[rmation]) {[PREPOSITION] [a ∣ the] ATTRIBUTE_VALUE ∣ BUSINESS_OBJECT} |
| is there (a ∣ any) way to |
| (audit ∣ examine ∣ check ∣ inspect ∣ peruse ∣ review ∣ see ∣ survey ∣ view ∣ query ∣ have [a] look at ∣ check out ∣ get an update ∣ get [some] [more] info[rmation]) {[PREPOSITION] [a ∣ the] |

TABLE 1-continued

Example Templates

ATTRIBUTE_VALUE | BUSINESS_OBJECT}
is there (a | any) way (I | one) (can | could | might)
(audit | examine | check | inspect | peruse | review | see | survey | view | query | have [a] look
at | check out | get an update | get [some] [more] info[rmation]) {[PREPOSITION] [a | the]
ATTRIBUTE_VALUE | BUSINESS_OBJECT}
[I] (need | want) <>*
[I] (need | request | want) [to] (query | ((ask | inquire) (about | regarding | with regards to)))
{[a | the] ATTRIBUTE_VALUE | BUSINESS_OBJECT}
[I] (would | ’d) like [to] (query | ((ask | inquire) (about | regarding | with regards to))) {[a | the]
ATTRIBUTE_VALUE | BUSINESS_OBJECT}
[I] must (query | ((ask | inquire) (about | regarding | with regards to))) {[a | the]
ATTRIBUTE_VALUE | BUSINESS_OBJECT}
[I] (have | need) a plan to (query | ((ask | inquire) (about | regarding | with regards to)))
{[a | the] ATTRIBUTE_VALUE | BUSINESS_OBJECT}
[I] (will | ’ll) (query | ((ask | inquire) (about | regarding | with regards to))) {[a | the]
ATTRIBUTE_VALUE | BUSINESS_OBJECT}
[I] (am | ’m) (about | going | planning) to | on (query | ((ask | inquire) (about | regarding | with
regards to))) {[a | the] ATTRIBUTE_VALUE | BUSINESS_OBJECT}
I’m gonna (audit | examine | check | inspect | peruse | review | see | survey | view | query | have
[a] look at | check out | get an update | get [some] [more] info[rmation]) {[PREPOSITION]
[a | the] ATTRIBUTE_VALUE | BUSINESS_OBJECT}
(can | could | may) I [please] (query | ((ask | inquire) (about | regarding | with regards to)))
{[a | the] ATTRIBUTE_VALUE | BUSINESS_OBJECT}
is it possible to (query | ((ask | inquire) (about | regarding | with regards to))) {[a | the]
ATTRIBUTE_VALUE | BUSINESS_OBJECT}
is there (a | any) way to (query | ((ask | inquire) (about | regarding | with regards to))) {[a | the]
ATTRIBUTE_VALUE | BUSINESS_OBJECT}
is there (a | any) way (I | one) (can | could | might) (query | ((ask | inquire)
(about | regarding | with regards to))) {[a | the] ATTRIBUTE_VALUE | BUSINESS_OBJECT}
*SN* [please] [(can | could | would) you] [please]
[display | list | show | pull | choose | indicate | calculate | find | locate | filter | give | share | provide
| search | bring up | tell me | look for] [me] (who | what | when | where | why | how | which | (are
there)) <>*
*SN* [please] [is it (possible | ok) to] [please]
[display | list | show | pull | choose | indicate | calculate | find | locate | filter | give | share | provide
| search | bring up | tell me | look for] [me] (who | what | when | where | why | how | which | (are
there)) <>*
*SN* [is there (a | any way) to]
[display | list | show | pull | choose | indicate | calculate | find | locate | filter | give | share | provide
| search | bring up | tell me | look for] [me] (who | what | when | where | why | how | which | (are
there)) <>*
*SN* [please] [can | could | would you] [please]
[display | list | show | pull | choose | indicate | calculate | find | locate | filter | give | share | provide
| search | bring up | tell me | look for] [me] (is | was | were | are | do | did | does) [a | the]
[ADJECTIVE] (NOUN | PRONOUN)) <>*
*SN* [please] [is it (possible | ok) to] [please]
[display | list | show | pull | choose | indicate | calculate | find | locate | filter | give | share | provide
| search | bring up | tell me | look for] [me] (is | was | were | are | do | did | does) [a | the]
[ADJECTIVE] (NOUN | PRONOUN)) <>*
*SN* [is there (a | any way) to]
[display | list | show | pull | choose | indicate | calculate | find | locate | filter | give | share | provide
| search | bring up | tell me | look for] [me] (is | was | were | are | do | did | does) [a | the]
[ADJECTIVE] (NOUN | PRONOUN)) <>*
[please] (can | could | may) I
is it possible to
is there (a | any) way to
is there (a | any) way (I | one) (can | could | might)
*SN* [I] (need | request | want) (you | u) (to | 2)
(display | list | show | pull | choose | indicate | calculate | find | locate | filter | give | share | provide
| search | bring up | tell me | look for | query)
*SN* [I] (would | ’d) like (you | u) (to | 2)
(display | list | show | pull | choose | indicate | calculate | find | locate | filter | give | share | provide
| search | bring up | tell me | look for | query)
*SN strict* are there <>*
*SN strict* get
DELETE
[please] ((can | could | would) you) [please]
(cancel | delete | discard | remove | undo | reverse) {[a | the]
ATTRIBUTE_VALUE | BUSINESS_OBJECT}
[please] (is it (possible | ok) to) [please]
(cancel | delete | discard | remove | undo | reverse) {[a | the]
ATTRIBUTE_VALUE | BUSINESS_OBJECT}
is there (a | any way) to (cancel | delete | discard | remove | undo | reverse) {[a | the]
ATTRIBUTE_VALUE | BUSINESS_OBJECT}
need help <>{0,3} cancelling
[I] (need | request | want) [to] (cancel | delete | discard | remove | undo | reverse)
{[a | the] ATTRIBUTE_VALUE | BUSINESS_OBJECT}
[I] (would | ’d) like [to] (cancel | delete | discard | remove | undo | reverse) {[a | the]

TABLE 1-continued

Example Templates

ATTRIBUTE_VALUE | BUSINESS_OBJECT}
[I] must (cancel | delete | discard | remove | undo | reverse) {[a | the]
ATTRIBUTE_VALUE | BUSINESS_OBJECT}
[I] (have | need) a plan to (cancel | delete | discard | remove | undo | reverse) {[a | the]
ATTRIBUTE_VALUE | BUSINESS_OBJECT}
[I] (will | 'll) (cancel | delete | discard | remove | undo | reverse) {[a | the]
ATTRIBUTE_VALUE | BUSINESS_OBJECT}
[I] (am | 'm) (about | going | planning) to | on
(cancel | delete | discard | remove | undo | reverse) {[a | the]
ATTRIBUTE_VALUE | BUSINESS_OBJECT}
I'm gonna (cancel | delete | discard | remove | undo | reverse) {[a | the]
ATTRIBUTE_VALUE | BUSINESS_OBJECT}
(can | could | may) I [please] (cancel | delete | discard | remove | undo | reverse) {[a | the]
ATTRIBUTE_VALUE | BUSINESS_OBJECT}
is it possible to (cancel | delete | discard | remove | undo | reverse) {[a | the]
ATTRIBUTE_VALUE | BUSINESS_OBJECT}
is there (a | any) way to (cancel | delete | discard | remove | undo | reverse) {[a | the]
ATTRIBUTE_VALUE | BUSINESS_OBJECT}
is there (a | any) way (I | one) (can | could | might)
(cancel | delete | discard | remove | undo | reverse) {[a | the]
ATTRIBUTE_VALUE | BUSINESS_OBJECT}
cancellation
[I] no longer need {[a | the] ATTRIBUTE_VALUE | BUSINESS_OBJECT}
[I] don't need ([a | the] ATTRIBUTE_VALUE | BUSINESS_OBJECT) anymore
CREATE
*SN* [(can | could | would) you] [please]
(create | enter | generate | make | record | request | schedule | submit | new | add)
{[a | the] (ATTRIBUTE_VALUE | BUSINESS_OBJECT)}
*SN* [is it (possible | ok) to] [please]
(create | enter | generate | make | record | request | schedule | submit | new | add)
{[a | the] (ATTRIBUTE_VALUE | BUSINESS_OBJECT)}
*SN* help <>{0,3}
(create | enter | generate | make | record | request | schedule | submit | new | add | creating |
entering | generating | making | recording | requesting | scheduling | submitting | adding)
{[a | the] (ATTRIBUTE_VALUE | BUSINESS_OBJECT)}
*SN* [I] (need | request | want) [to]
(create | enter | generate | make | record | request | schedule | submit | new | add)
{[a | the] (ATTRIBUTE_VALUE | BUSINESS_OBJECT)}
*SN* [I] (would | 'd) like [to]
(create | enter | generate | make | record | request | schedule | submit | new | add)
{[a | the] (ATTRIBUTE_VALUE | BUSINESS_OBJECT)}
*SN* [I] must
(create | enter | generate | make | record | request | schedule | submit | new | add)
{[a | the] (ATTRIBUTE_VALUE | BUSINESS_OBJECT)}
*SN* [I] (have | need) a plan to
(create | enter | generate | make | record | request | schedule | submit | new | add)
{[a | the] (ATTRIBUTE_VALUE | BUSINESS_OBJECT)}
*SN* [I] (will | 'll)
(create | enter | generate | make | record | request | schedule | submit | new | add)
{[a | the] (ATTRIBUTE-VALUE | BUSINESS_OBJECT)}
*SN* [I] (am | 'm) (about | going | planning) (to | on)
(create | enter | generate | make | record | request | schedule | submit | new | add)
{[a | the] (ATTRIBUTE_VALUE | BUSINESS_OBJECT)}
*SN* I'm gonna
(create | enter | generate | make | record | request | schedule | submit | new | add)
{[a | the] (ATTRIBUTE_VALUE | BUSINESS_OBJECT)}
*SN* (can | could | may) I [please]
(create | enter | generate | make | record | request | schedule | submit | new | add)
{[a | the] (ATTRIBUTE_VALUE | BUSINESS_OBJECT)}
*SN* is it possible to
(create | enter | generate | make | record | request | schedule | submit | new | add)
{[a | the] (ATTRIBUTE_VALUE | BUSINESS_OBJECT)}
*SN* is there (a | any) way to
(create | enter | generate | make | record | request | schedule | submit | new | add)
{[a | the] (ATTRIBUTE_VALUE | BUSINESS_OBJECT)}
*SN* is there (a | any) way (I | one) (can | could | might)
(create | enter | generate | make | record | request | schedule ] submit | new | add)
{[a | the] (ATTRIBUTE_VALUE | BUSINESS_OBJECT)}
add [a | the] [ADJECTIVE] BUSINESS_OBJECT <>*
UPDATE
[can you] [please]
(update | change | modify | adapt | adjust | alter | edit | add | increase | set | rename) <>*
ATTRIBUTE_NAME <>* to (ATTRIBUTE_VALUE | CURRENCY | PERSON | MEASURE)
[can you] [please]
(update | change | modify | adapt | adjust | alter | edit | add | increase | set | rename) <>*
ATTRIBUTE_NAME <>* to ATTRIBUTE_NAME [: | - | =]
(ATTRIBUTE_VALUE | CURRENCY | PERSON | MEASURE)
[can you] [please]

TABLE 1-continued

Example Templates (update | change | modify ] adapt | adjust | alter | edit | add | increase | set | rename | move |
transfer | add) <>* (to | with) (ATTRIBUTE_VALUE)
[can you] [please]
(update | change | modify | adapt | adjust | alter | edit | add | increase | set | rename | move |
transfer | add) <>* (to | with) ATTRIBUTE_NAME
(ATTRIBUTE_VALUE | CURRENCY | PERSON | MEASURE)
[can you] [please]
(update | change | modify | adapt | adjust | alter | edit | add | increase | set | rename) <>*
ATTRIBUTE_NAME (: | - | =) (ATTRIBUTE_VALUE | CURRENCY | PERSON | MEASURE)
[can you] [please] (add | set | assign) <>{0,2}
(ATTRIBUTE_VALUE | CURRENCY | PERSON | MEASURE) as <>{0,6} ATTRIBUTE_NAME
[can you] [please] (add | set | assign) <>{0,2} ATTRIBUTE_NAME <>{0,2}
ATTRIBUTE_VALUE
[can you] [please] (replace) <>{0,2} ATTRIBUTE_NAME <>* (by | with)
ATTRIBUTE_VALUE
new ATTRIBUTE NAME <>{0,7} (is | are | was | were | be) ADVERB?
(ATTRIBUTE_VALUE | CURRENCY | PERSON | MEASURE)
new ATTRIBUTE_NAME <>{0,7} [: | - | =] ADVERB?
(ATTRIBUTE_VALUE | CURRENCY | PERSON | MEASURE)
*SN strict* (a | the)? (NOUN | ADJECTIVE | NUMERAL)* ATTRIBUTE_VALUE
[PREPOSITION (NOUN | ADJECTIVE | NUMERAL)+] (is | was) (is | are | was | were | be)
ATTRIBUTE_NAME
*SN strict* (a | the)? (NOUN | ADJECTIVE | NUMERAL)* ATTRIBUTE_NAME
[PREPOSITION (NOUN | ADJECTIVE | NUMERAL)+] (is | was) (is | are | was | were | be)
ATTRIBUTE_VALUE
DIALOG TYPES
*SN strict* [co[-]pilot | co pilot | PERSON] [please] [,] (no | nope | no way | PRONOUN
do not) [PUNCTUATION] *SN strict*
*SN strict* <>{0,2} (yes | correct | affirmative | agree | I do) <>{0,2} *SN strict*
EXCEPTIONS: I do not, what can I do
*SN strict* [co[-]pilot | co pilot | PERSON] [please] [,] [I] (need | request | want) [to]
(stop | cancel | abort | quit | exit | start over) [the] [dialog | conversation] [please]
[PUNCTUATION] *SN strict*
*SN strict* [co[-]pilot | co pilot | PERSON] [please] [,] [I] (would | 'd) like [to]
(stop | cancel | abort | quit | exit | start over) [the] [dialog | conversation] [please]
[PUNCTUATION] *SN strict*
*SN strict* [co[-]pilot | co pilot | PERSON] [please] [,] [I] must
(stop | cancel | abort | quit | exit | start over) [the] [dialog | conversation] [please]
[PUNCTUATION] *SN strict*
*SN strict* [co[-]pilot | co pilot | PERSON] [please] [,] [I] (have | need) a plan to
(stop | cancel | abort | quit | exit | start over) [the] [dialog | conversation] [please]
[PUNCTUATION] *SN strict*
*SN strict* [co[-]pilot | co pilot | PERSON] [please] [,] [I] (will | 'll)
(stop | cancel | abort | quit | exit | start over) [the] [dialog | conversation] [please]
[PUNCTUATION] *SN strict*
*SN strict* [co[-]pilot | co pilot | PERSON] [please] [,] [I] (am | 'm)
(about | going | planning) (to | on) (stop | cancel | abort | quit | exit | start over) [the]
[dialog | conversation] [please] [PUNCTUATION] *SN strict*
*SN strict* [co[-]pilot | co pilot | PERSON] [please] [,] I'm gonna
(stop | cancel | abort | quit | exit | start over) [the] [dialog | conversation] [please]
[PUNCTUATION] *SN strict*
*SN strict* [co[-]pilot | co pilot | PERSON] [please] [,] (can | could | may) I [please]
(stop | cancel | abort | quit | exit | start over) [the] [dialog | conversation] [please]
[PUNCTUATION] *SN strict*
*SN strict* [co[-]pilot | co pilot | PERSON] [please] [,] is it possible to
(stop | cancel | abort | quit | exit | start over) [the] [dialog | conversation] [please]
[PUNCTUATION] *SN strict*
*SN strict* [co[-]pilot | co pilot | PERSON] [please] [,] is there (a | any) way to
(stop | cancel | abort | quit | exit | start over) [the] [dialog | conversation] [please]
[PUNCTUATION] *SN strict*
*SN strict* [co[-]pilot | co pilot | PERSON] [please] [,] is there (a | any) way (I | one)
(can | could | might) (stop | cancel | abort | quit | exit | start over) [the]
[dialog | conversation] [please] [PUNCTUATION] *SN strict*
SORTING
(sort | sorting | sorted | order | ordering | ordered | rank | ranking | ranked) <>* by
[lowest | smallest | small | low | biggest | highest | largest | big | high] (a | the)
ATTRIBUTE_NAME
(sort | sorting | sorted | order | ordering | ordered | rank | ranking | ranked) <>* by
(ascending | alphabetical | alphabetic | descending | reverse) ATTRIBUTE_NAME
(biggest | highest | largest | big | high) to (lowest | smallest | small | low)
(lowest | smallest | small | low) to (biggest | highest | largest | big | high)
(lowest | smallest | small | low | biggest | highest | largest | big | high)
[ATTRIBUTE_NAME] (first | last)
(start | starting | begin | beginning) (with | from)
(lowest | smallest | small | low | biggest | highest | largest | big | high)
[ATTRIBUTE_NAME]
[ATTRIBUTE_NAME] (ascending | alphabetical | alphabetic | descending | reverse)
[ATTRIBUTE_NAME]

TABLE 1-continued

Example Templates

ATTRIBUTE VALUE PAIR
ATTRIBUTE_NAME [: | - | = | is | are | was | were | equal [to] | of]
[about | around | approximately | approx | aprox | over | under | (less | more | greater)
than | at (most | least)] (ATTRIBUTE_VALUE | CURRENCY | MEASURE)
(ATTRIBUTE_VALUE | CURRENCY | MEASURE) [is | are | was | were | equal [to]]
ATTRIBUTE_NAME
*ATTRIBUTE_NAME containing (date | time | duration | at | on) *
[is | are | was | were | equal [to] | of] (DATE | DURATION)
*ATTRIBUTE_NAME containing name * [is | are | was | were | equal [to]]
NOUN_GROUP
*ATTRIBUTE_NAME containing (price | size | length | width | height | cost) *
[is | are | was | were | equal [to]]
[about | around [approximately | approx | aprox | over | under | (less | more | greater)
than | at (most | least)] NUMERIC_VALUE
REFERENCE
(this | these | that | those)
(BUSINESS_OBJECT | one | item | element | entry | entrie | activity)
(first | initial | last | final | 1st | first | penultimate | top | bottom | initial | 2nd | second | 3rd |
third | 4th | fourth | 5th | fifth | 6th | sixth | 7th | seventh | 8th | eighth | 9th | ninth |
10th | tenth | 11th | eleventh | 12th | twelfth | 13th | thirteenth | 14th | fourteenth | 15th |
fifteenth | 16th | sixteenth | 17th | seventeenth | 18th | eighteenth | 19th | nineteenth | 20th |
twentieth) (BUSINESS_OBJECT | one | item | element | entry | entrie | activity)
(next | following | prior | previous | preceding)
(BUSINESS_OBJECT | one | item | element | entry | entrie | activity)
my [own] (BUSINESS_OBJECT | one | item | element | entry | entrie | activity)
MODIFIER
(about | around | approximately | approx | aprox)
(NUMERIC_VALUE | CURRENCY | MEASURE)
(less than | no (more | greater) than | under | at most | <)
(NUMERIC_VALUE | CURRENCY | MEASURE)
((more | greater) than | no less than | over | at | least)
(NUMERIC_VALUE | CURRENCY | MEASURE)
((no | not) (more | greater | higher | bigger) than | no less than | at [the]
(greatest | most | highest | biggest)) (NUMERIC_VALUE | CURRENCY | MEASURE)
((more | greater | higher | bigger) than | over | >)
(NUMERIC_VALUE | CURRENCY | MEASURE)
(before | earlier than) DATE
(after | later than) DATE
((no | not) (fewer | less | lower | smaller) than | at [the]
(lowest | least | fewest | smallest) | >= | => | (more | greater | higher | bigger) or equal to)
(NUMERIC_VALUE | CURRENCY | MEASURE)
between (NUMERIC_VALUE | CURRENCY | MEASURE) and
(NUMERIC_VALUE | CURRENCY | MEASURE)
from (NUMERIC_VALUE | CURRENCY | MEASURE) to
(NUMERIC_VALUE | CURRENCY | MEASURE)

Example 32—Example Linguistic Expressions

In any of the examples herein, linguistic expressions (or simply "expressions") can take the form of a text string that mimics what a user would or might speak when interacting with a particular service. In practice, the linguistic expression takes the form of a sentence or sentence fragment (e.g., with subject, verb; subject, verb, object; verb, object; or the like).

The following provides non-limiting examples of linguistic expressions that can be used in the technologies described herein. In practice, the linguistic expressions will vary according to use case and/or domain. The examples relate to a "create" intent (e.g., as generated by the templates of the above example), but any number of other linguistic expressions can be supported. In practice "ATTRIBUTE_VALUE" can be replaced by domain-specific vocabulary.

TABLE 2

Example Linguistic Expressions

| | Intent - Sentence |
|---|---|
| delete | create create ATTRIBUTE_VALUE |
| delete | create please is it possible to create ATTRIBUTE_VALUE |
| delete | create is it possible to please create ATTRIBUTE_VALUE |
| delete | create please create ATTRIBUTE_VALUE |
| delete | create can you please create ATTRIBUTE_VALUE |
| delete | create would you create ATTRIBUTE_VALUE |
| | create I need create ATTRIBUTE_VALUE |
| | create would like to create ATTRIBUTE_VALUE |
| | create i would like create ATTRIBUTE_VALUE |
| | create i'd like create ATTRIBUTE_VALUE |
| | create i must create ATTRIBUTE_VALUE |
| | create must create ATTRIBUTE_VALUE |
| | create i need a plan to create ATTRIBUTE_VALUE |
| | create have a plan to create ATTRIBUTE_VALUE |
| | create I am going on create ATTRIBUTE_VALUE |
| | create about to create ATTRIBUTE_VALUE |
| | create can i please create ATTRIBUTE_VALUE |
| | create could i create ATTRIBUTE_VALUE |
| | create can i create ATTRIBUTE_VALUE |
| | create may i please create ATTRIBUTE_VALUE |
| | create is there a way to create ATTRIBUTE_VALUE |
| | create is there any way one can create ATTRIBUTE_VALUE |
| | create is there any way i could create ATTRIBUTE_VALUE |
| | create is there any way one could create ATTRIBUTE_VALUE |
| | create is there any way i might create ATTRIBUTE_VALUE |
| | create is there a way one could create ATTRIBUTE_VALUE |
| | create is there a way i might create ATTRIBUTE_VALUE |

TABLE 2-continued

| Example Linguistic Expressions | |
|---|---|
| delete | create help create ATTRIBUTE_VALUE<br>create is it ok to please enter ATTRIBUTE_VALUE<br>and the like |

Example 33—Example Implementation

In any of the examples herein, one or more non-transitory computer-readable media comprise computer-executable instructions that, when executed, cause a computing system to perform a method. Such a method can comprise the following:

based on a plurality of stored linguistic expression generation templates following a syntax, generating a plurality of generated textual linguistic expressions;

from the plurality of generated textual linguistic expressions, with a text-to-speech service, generating a plurality of synthetic speech audio recordings for developing a speech-to-text service, wherein the generating comprises adjusting a speech accent in the text-to-speech service;

applying background noise to at least one of the plurality of synthetic speech audio recordings; and training the speech-to-text service with selected training synthetic speech audio recordings of the plurality of generated synthetic speech audio recordings.

Example 34—Example Advantages

A number of advantages can be achieved via the technologies described herein because they can rapidly and easily generate mass amounts of expressions for service development. For example, in any of the examples herein, the technologies can be used to develop services in any number of human languages. Such deployment of a large number of high-quality services can be greatly aided by the technologies described herein.

Further advantages of the technologies described herein can include rapid and easy generation of accurate text outputs which take into account the various adjustments described herein.

Such technologies can greatly reduce the development cycle and resources needed to develop a speech-to-text service, leading to more widespread use of helpful, accurate services in various domains.

The challenges of finding good training material that takes into account various background noises and other audio distortions can be formidable. Therefore, the technologies allow quality services to be developed for operation in environments and conditions which may interfere with conventional speech-to-text services.

Example 35—Example Computing Systems

Figure 13:
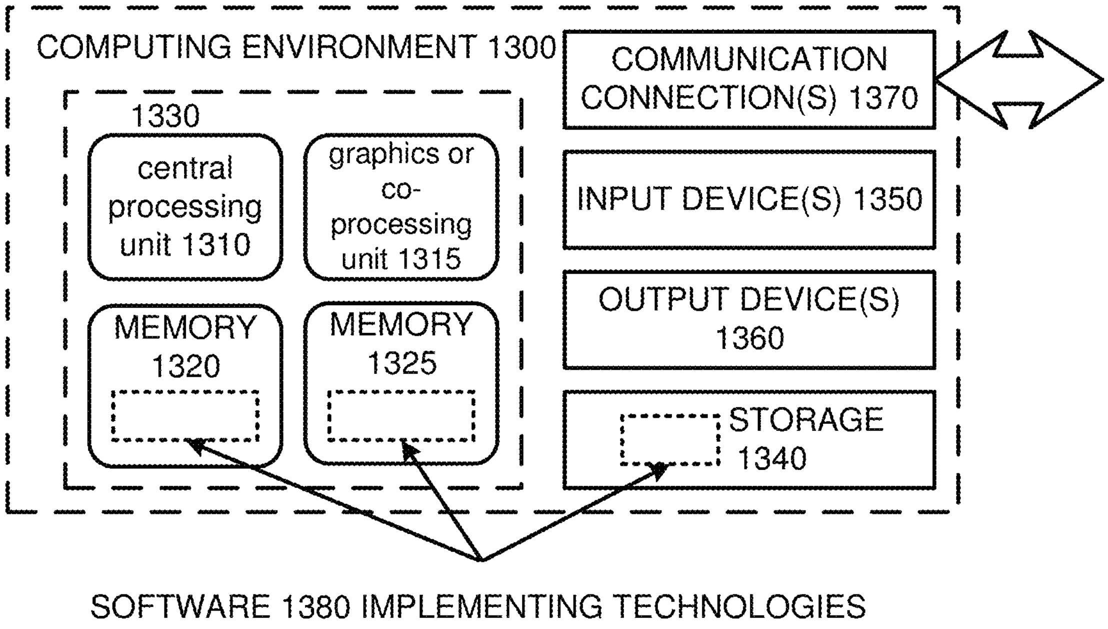
FIG. 13 is a block diagram of an example computing system in which described embodiments can be implemented.

FIG. 13 depicts an example of a suitable computing system 1300 in which the described innovations can be implemented. The computing system 1300 is not intended to suggest any limitation as to scope of use or functionality of the present disclosure, as the innovations can be implemented in diverse computing systems.

With reference to FIG. 13, the computing system 1300 includes one or more processing units 1310, 1315 and memory 1320, 1325. In FIG. 13, this basic configuration 1330 is included within a dashed line. The processing units 1310, 1315 execute computer-executable instructions, such as for implementing the features described in the examples herein. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 13 shows a central processing unit 1310 as well as a graphics processing unit or co-processing unit 1315. The tangible memory 1320, 1325 can be volatile memory (e.g., registers, cache, RAM), non-volatile memory (e.g., ROM, EEPROM, flash memory, etc.), or some combination of the two, accessible by the processing unit(s) 1310, 1315. The memory 1320, 1325 stores software 1380 implementing one or more innovations described herein, in the form of computer-executable instructions suitable for execution by the processing unit(s) 1310, 1315.

A computing system 1300 can have additional features. For example, the computing system 1300 includes storage 1340, one or more input devices 1350, one or more output devices 1360, and one or more communication connections 1370, including input devices, output devices, and communication connections for interacting with a user. An interconnection mechanism (not shown) such as a bus, controller, or network interconnects the components of the computing system 1300. Typically, operating system software (not shown) provides an operating environment for other software executing in the computing system 1300, and coordinates activities of the components of the computing system 1300.

The tangible storage 1340 can be removable or non-removable, and includes magnetic disks, magnetic tapes or cassettes, CD-ROMs, DVDs, or any other medium which can be used to store information in a non-transitory way and which can be accessed within the computing system 1300. The storage 1340 stores instructions for the software 1380 implementing one or more innovations described herein.

The input device(s) 1350 can be an input device such as a keyboard, mouse, pen, or trackball, a voice input device, a scanning device, touch device (e.g., touchpad, display, or the like) or another device that provides input to the computing system 1300. The output device(s) 1360 can be a display, printer, speaker, CD-writer, or another device that provides output from the computing system 1300.

The communication connection(s) 1370 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the context of computer-executable instructions, such as those included in program modules, being executed in a computing system on a target real or virtual processor (e.g., which is ultimately executed on one or more hardware processors). Generally, program modules or components include routines, programs, libraries, objects, classes, components, data structures, etc. that perform particular tasks or implement particular abstract data types. The functionality of the program modules can be combined or split between program modules as desired in various embodiments. Computer-executable instructions for program modules can be executed within a local or distributed computing system.

For the sake of presentation, the detailed description uses terms like "determine" and "use" to describe computer operations in a computing system. These terms are high-level descriptions for operations performed by a computer and should not be confused with acts performed by a human being. The actual computer operations corresponding to these terms vary depending on implementation.

Example 36—Computer-Readable Media

Any of the computer-readable media herein can be non-transitory (e.g., volatile memory such as DRAM or SRAM, nonvolatile memory such as magnetic storage, optical storage, or the like) and/or tangible. Any of the storing actions described herein can be implemented by storing in one or more computer-readable media (e.g., computer-readable storage media or other tangible media). Any of the things (e.g., data created and used during implementation) described as stored can be stored in one or more computer-readable media (e.g., computer-readable storage media or other tangible media). Computer-readable media can be limited to implementations not consisting of a signal.

Any of the methods described herein can be implemented by computer-executable instructions in (e.g., stored on, encoded on, or the like) one or more computer-readable media (e.g., computer-readable storage media or other tangible media) or one or more computer-readable storage devices (e.g., memory, magnetic storage, optical storage, or the like). Such instructions can cause a computing system to perform the method. The technologies described herein can be implemented in a variety of programming languages.

Example 37—Example Cloud Computing Environment

Figure 14:
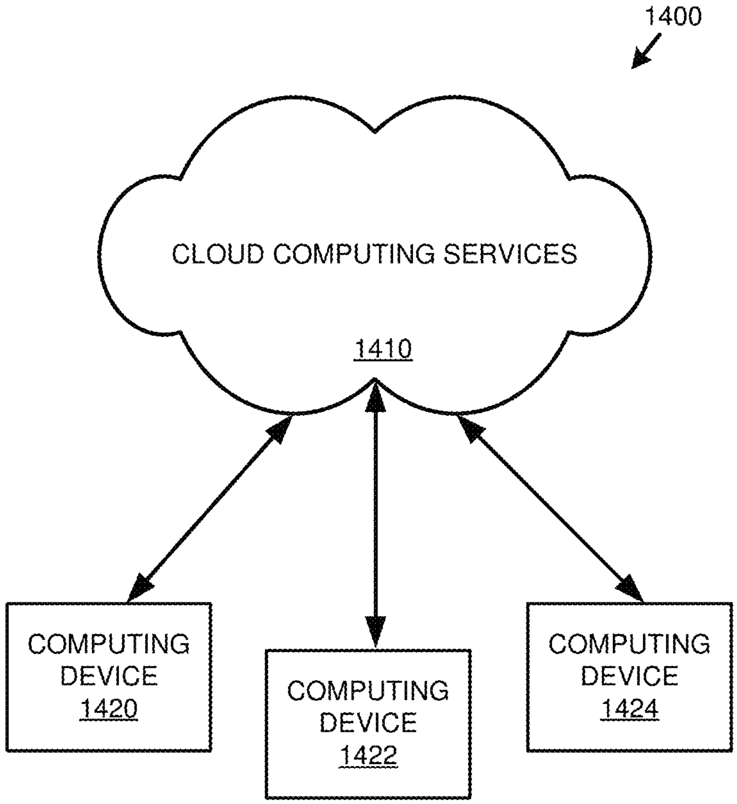
FIG. 14 is a block diagram of an example cloud computing environment that can be used in conjunction with the technologies described herein.

FIG. 14 depicts an example cloud computing environment 1400 in which the described technologies can be implemented, including, e.g., the system 100 of FIG. 1 and other systems herein. The cloud computing environment 1400 comprises cloud computing services 1410. The cloud computing services 1410 can comprise various types of cloud computing resources, such as computer servers, data storage repositories, networking resources, etc. The cloud computing services 1410 can be centrally located (e.g., provided by a data center of a business or organization) or distributed (e.g., provided by various computing resources located at different locations, such as different data centers and/or located in different cities or countries).

The cloud computing services 1410 are utilized by various types of computing devices (e.g., client computing devices), such as computing devices 1420, 1422, and 1424. For example, the computing devices (e.g., 1420, 1422, and 1424) can be computers (e.g., desktop or laptop computers), mobile devices (e.g., tablet computers or smart phones), or other types of computing devices. For example, the computing devices (e.g., 1420, 1422, and 1424) can utilize the cloud computing services 1410 to perform computing operations (e.g., data processing, data storage, and the like).

In practice, cloud-based, on-premises-based, or hybrid scenarios can be supported.

Example 38—Example Implementations

Although the operations of some of the disclosed methods are described in a particular, sequential order for convenient presentation, such manner of description encompasses rearrangement, unless a particular ordering is required by specific language set forth herein. For example, operations described sequentially can in some cases be rearranged or performed concurrently.

Example 39—Example Implementations

Any of the following can be implemented.

Clause 1. A computer-implemented method of automated speech-to-text training data generation comprising:

based on a plurality of stored linguistic expression generation templates following a syntax, generating a plurality of generated textual linguistic expressions;

from the plurality of generated textual linguistic expressions, with a text-to-speech service, generating a plurality of synthetic speech audio recordings for developing a speech-to-text service;

training the speech-to-text service with selected training synthetic speech audio recordings of the plurality of generated synthetic speech audio recordings; and validating the trained speech-to-text service with selected validation virtual speech audio recordings of the plurality of synthetic speech audio recordings.

Clause 2. The computer-implemented method of Clause 1 wherein:

generating the plurality of synthetic speech audio recordings comprises adjusting one or more pre-generation speech characteristics in the text-to-speech service.

Clause 3. The computer-implemented method of Clause 2 wherein:

the one or more pre-generation speech characteristics comprise speech accent.

Clause 4. The computer-implemented method of Clause 2 or 3 wherein:

the one or more pre-generation speech characteristics comprise speaker gender.

Clause 5. The computer-implemented method of Clause 2, 3, or 4 wherein:

the one or more pre-generation speech characteristics comprise speech rate.

Clause 6. The computer-implemented method of any one of Clauses 1-5 further comprising:

applying a post-generation audio adjustment to at least one of the plurality of synthetic speech audio recordings.

Clause 7. The computer-implemented method of Clause 6 wherein:

the post-generation adjustment comprises applying background noise.

Clause 8. The computer-implemented method of any one of Clauses 1-7 wherein:

the plurality of synthetic speech audio recordings are associated with respective original texts before the synthetic speech audio recording is recognized.

Clause 9. The computer-implemented method of any one of Clauses 1-8 wherein:

a given synthetic speech audio recording is associated with original text used to generate the given synthetic speech audio recording; and the original text is used during the training.

Clause 10. The computer-implemented method of any one of Clauses 1-9 further comprising:

receiving a target domain for the speech-to-text service; wherein:

generating the plurality of generated textual linguistic expressions comprises applying keywords from the target domain.

Clause 11. The computer-implemented method of any one of Clauses 1-10 wherein:

the syntax supports multiple alternative phrases; and at least one of the plurality of stored linguistic expression generation templates incorporates at least one instance of multiple alternative phrases.

Clause 12. The computer-implemented method of any one of Clauses 1-11 wherein:

the syntax supports optional phrases; and at least one of the plurality of stored linguistic expression generation templates incorporates an optional phrase.

Clause 13. The computer-implemented method of any one of Clauses 1-12 further comprising:

selecting a subset of the plurality of generated synthetic speech audio recordings for training.

Clause 14. The computer-implemented method of any one of Clauses 1-13 wherein:

the syntax supports regular expressions.

Clause 14bis. One or more non-transitory computer-readable media comprising computer-executable instructions that, when executed, cause a computing system to perform the method of any one of the Clauses 1-14.

Clause 15. A computing system comprising:

one or more processors;

memory storing a plurality of stored linguistic expression generation templates following a syntax;

wherein the memory is configured to cause the one or more processors to perform operations comprising:

based on the plurality of stored linguistic expression generation templates, generating a plurality of generated textual linguistic expressions;

from the plurality of generated textual linguistic expressions, with a text-to-speech service, generating a plurality of synthetic speech audio recordings for developing a speech-to-text service; and training the speech-to-text service with selected training synthetic speech audio recordings of the plurality of generated synthetic speech audio recordings.

Clause 16. The computing system of Clause 15 further comprising:

a digital representation of background noise;

wherein the operations further comprise:

applying the digital representation of background noise to at least one of the plurality of synthetic speech audio recordings.

Clause 17. The computing system of Clause 16 wherein the operations further comprise:

receiving an indication of a custom background noise; and using the custom background noise as the digital representation of background noise.

Clause 18. The computing system of any one of Clauses 15-17 further comprising:

a dictionary of domain-specific vocabulary comprising nouns of objects acted upon in a particular domain;

wherein the operations further comprise:

applying the domain-specific vocabulary when generating the plurality of generated textual linguistic expressions.

Clause 19. The computing system of Clause 18 wherein:

at least one given template of the linguistic expression generation templates specifies that an attribute value is to be included when generating a textual linguistic expression from the given template; and generating the plurality of generated textual linguistic expressions comprises including a word from a domain-specific dictionary in the textual linguistic expression.

Clause 20. One or more non-transitory computer-readable media comprising computer-executable instructions that, when executed, cause a computing system to perform a method comprising:

based on a plurality of stored linguistic expression generation templates following a syntax, generating a plurality of generated textual linguistic expressions;

from the plurality of generated textual linguistic expressions, with a text-to-speech service, generating a plurality of synthetic speech audio recordings for developing a speech-to-text service, wherein the generating comprises adjusting a speech accent in the text-to-speech service;

applying background noise to at least one of the plurality of synthetic speech audio recordings; and training the speech-to-text service with a plurality of selected training synthetic speech audio recordings of the plurality of generated synthetic speech audio recordings.

Example 40—Example Alternatives

The technologies from any example can be combined with the technologies described in any one or more of the other examples. In view of the many possible embodiments to which the principles of the disclosed technology can be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A computer-implemented method of automated speech-to-text training data generation comprising:

based on a stored linguistic expression generation template following a syntax, generating a plurality of generated textual linguistic expressions, the linguistic expression generation template comprising (1) a first set of two or more alternative tokens, wherein an alternative token of the set is included within a given linguistic expression of the plurality of generated linguistic expressions; or (2) a variable configured to be replaced by a retrieved value of the variable in generating a generation linguistic expression of the plurality of generated linguistic expressions, wherein the generating in (1) or (2) comprises generating respective generated linguistic expressions for multiple tokens of the first set of two or more alternative tokens, or generating respective generated linguistic expressions using different values retrieved values of the variable;

from the plurality of generated textual linguistic expressions, with a text-to-speech service, generating a plurality of synthetic speech audio recordings for developing a speech-to-text service; and training the speech-to-text service with training synthetic speech audio recordings of the plurality of generated synthetic speech audio recordings.

2. The computer-implemented method of claim 1 wherein:

generating the plurality of synthetic speech audio recordings comprises guiding the generation by adjusting one or more pre-generation speech characteristics in the text-to-speech service.

3. The computer-implemented method of claim 2 wherein:

the one or more pre-generation speech characteristics comprise speech accent.

4. The computer-implemented method of claim 2 wherein:

the one or more pre-generation speech characteristics comprise speaker gender.

5. The computer-implemented method of claim 2 wherein:

the one or more pre-generation speech characteristics comprise speech rate.

6. The computer-implemented method of claim 1 further comprising:

applying a post-generation audio adjustment to at least one of the plurality of synthetic speech audio recordings.

7. The computer-implemented method of claim 6 wherein:

the post-generation adjustment comprises applying background noise.

8. The computer-implemented method of claim 1 wherein:

the plurality of synthetic speech audio recordings are associated with respective original texts before the synthetic speech audio recording is recognized.

9. The computer-implemented method of claim 1 wherein:

a given synthetic speech audio recording is associated with original text used to generate the given synthetic speech audio recording; and the original text is used during the training.

10. The computer-implemented method of claim 1 further comprising:

receiving a target domain for the speech-to-text service; wherein:

generating the plurality of generated textual linguistic expressions comprises applying keywords from the target domain.

11. The computer-implemented method of claim 1 wherein:

the syntax supports multiple alternative phrases; and at least one of the plurality of stored linguistic expression generation templates incorporates at least one instance of multiple alternative phrases.

12. The computer-implemented method of claim 1 wherein:

the syntax supports optional phrases; and at least one of the plurality of stored linguistic expression generation templates incorporates an optional phrase.

13. The computer-implemented method of claim 1 further comprising:

selecting a subset of the plurality of generated synthetic speech audio recordings for training the speech-to-text service.

14. The computer-implemented method of claim 1 wherein:

the syntax supports regular expressions.

15. A computing system comprising:

one or more processors;

memory storing a linguistic expression generation template following a syntax;

wherein the memory is configured to cause the one or more processors to perform operations comprising:

based on the stored linguistic expression generation template, generating a plurality of generated textual linguistic expressions, the linguistic expression generation template comprising (1) a first set of two or more alternative tokens, wherein an alternative token of the set is included within a given linguistic expression of the plurality of generated linguistic expressions; or (2) a variable configured to be replaced by a retrieved value of the variable in generating a generation linguistic expression of the plurality of generated linguistic expressions, wherein the generating in (1) or (2) comprises generating respective generated linguistic expressions for multiple tokens of the first set of two or more alternative tokens or generating respective generated linguistic expressions using different values retrieved values of the variable;

from the plurality of generated textual linguistic expressions, with a text-to-speech service, generating a plurality of synthetic speech audio recordings for developing a speech-to-text service; and training the speech-to-text service with training synthetic speech audio recordings of the plurality of generated synthetic speech audio recordings.

16. The computing system of claim 15 further comprising:

a digital representation of background noise;

wherein the operations further comprise:

applying the digital representation of background noise to at least one of the plurality of synthetic speech audio recordings.

17. The computing system of claim 16 wherein the operations further comprise:

receiving an indication of a custom background noise; and using the custom background noise as the digital representation of background noise.

18. The computing system of claim 15 further comprising:

a dictionary of domain-specific vocabulary comprising nouns of objects acted upon in a particular domain;

wherein the operations further comprise:

applying the domain-specific vocabulary when generating the plurality of generated textual linguistic expressions.

19. The computing system of claim 18 wherein:

at least one given template of the linguistic expression generation templates specifies that an attribute value is to be included when generating a textual linguistic expression from the given template; and generating the plurality of generated textual linguistic expressions comprises including a word from a domain-specific dictionary in the textual linguistic expression.

20. One or more non-transitory computer-readable media comprising computer-executable instructions that, when executed, cause a computing system to perform operations comprising:

based on a stored linguistic expression generation template following a syntax, generating a plurality of generated textual linguistic expressions, the linguistic expression generation template comprising (1) a first set of two or more alternative tokens, wherein an alternative token of the set is included within a given linguistic expression of the plurality of generated linguistic expressions; or (2) a variable configured to be replaced by a retrieved value of the variable in generating a generation linguistic expression of the plurality of generated linguistic expressions, wherein the generating in (1) or (2) comprises generating respective generated linguistic expressions for multiple tokens of the first set of two or more alternative tokens or generating respective generated linguistic expressions using different values retrieved values of the variable;

from the plurality of generated textual linguistic expressions, with a text-to-speech service, generating a plurality of synthetic speech audio recordings for developing a speech-to-text service, wherein the generating comprises adjusting a speech accent in the text-to-speech service;

applying background noise to at least one of the plurality of synthetic speech audio recordings; and training the speech-to-text service with selected training synthetic speech audio recordings of the plurality of generated synthetic speech audio recordings.

* * * * *